United States Patent [19]
Okada

[11] Patent Number: 5,682,000
[45] Date of Patent: *Oct. 28, 1997

[54] SENSOR USING PIEZOELECTRIC ELEMENTS

[76] Inventor: Kazuhiro Okada, 73, Sugaya 4-Chome, Ageo-Shi, Saitama, 362, Japan

[*] Notice: The term of this patent shall not extend beyond the expiration date of Pat. No. 5,571,972.

[21] Appl. No.: 701,964

[22] Filed: Aug. 23, 1996

Related U.S. Application Data

[62] Division of Ser. No. 267,044, Jun. 28, 1994, Pat. No. 5,571,972.

[30] Foreign Application Priority Data

Jul. 29, 1993 [JP] Japan ............................ 5-207118

[51] Int. Cl.$^6$ ................................................. G01L 3/00
[52] U.S. Cl. ........................ 73/862.043; 73/DIG. 4; 73/862.68
[58] Field of Search .................. 73/862.041, 862.042, 73/862.043, 862.68, DIG. 4

[56] References Cited

U.S. PATENT DOCUMENTS

| | | |
|---|---|---|
| 4,615,214 | 10/1986 | Burns .................... 73/DIG. 4 X |
| 4,802,371 | 2/1989 | Calderara et al. .......... 73/DIG. 4 |
| 4,905,523 | 3/1990 | Okada . |
| 4,967,605 | 11/1990 | Okada . |
| 4,969,366 | 11/1990 | Okada . |
| 5,014,415 | 5/1991 | Okada . |
| 5,035,148 | 7/1991 | Okada . |
| 5,092,645 | 3/1992 | Okada . |
| 5,182,515 | 1/1993 | Okada . |
| 5,263,375 | 11/1993 | Okada . |
| 5,295,386 | 3/1994 | Okada . |
| 5,343,765 | 9/1994 | Okada . |
| 5,365,799 | 11/1994 | Okada .................... 73/862.043 X |
| 5,431,064 | 7/1995 | Franz ..................... 73/867.68 |
| 5,571,972 | 11/1996 | Okada .................... 73/DIG. 4 X |

FOREIGN PATENT DOCUMENTS

| | | |
|---|---|---|
| 3058121 | 3/1988 | Japan . |
| 93/00390 | 11/1993 | WIPO . |

*Primary Examiner*—Elizabeth L. Dougherty
*Attorney, Agent, or Firm*—Ladas & Parry

[57] ABSTRACT

The periphery of a disk having flexibility is fixed to a sensor casing, and a force applied to the central portion is detected. A doughnut disk-shaped piezoelectric element is positioned on the upper surface of the disk, and upper electrode layers indicated by patterns of D1 to D6 are formed on the upper surface of the piezoelectric element. Further, lower electrode layers similarly having pattern of D1 to D6 are formed on the lower surface of the piezoelectric element, and the lower surface of the lower electrode layer is fixed on the upper surface of the disk. Six detection elements D1 to D6 are formed each of which is constituted by a of upper and lower electrode layers and a portion of piezoelectric element put therebetween. Thus, force components exerted at an origin defined in the central portion of the disk in respective axes directions of X, Y, Z can be detected based on charges produced in detection elements D1, D2, detection elements D3, D4, and detection elements D5, D6, respectively.

24 Claims, 18 Drawing Sheets

TYPE I

POLARITY OF CHARGE PRODUCED ON UPPER ELECTRODE

|  | FOR DETECTION OF Fx | | FOR DETECTION OF Fy | | FOR DETECTION OF Fz | | | |
|---|---|---|---|---|---|---|---|---|
|  | D1 | D2 | D3 | D4 | D5 | D6 | D7 | D8 |
| Fx | + | − | 0 | 0 | − | + | 0 | 0 |
| Fy | 0 | 0 | − | + | 0 | 0 | + | − |
| Fz | + | + | − | − | − | − | + | + |

TYPE II

POLARITY OF CHARGE PRODUCED
ON UPPER ELECTRODE

|  | FOR DETECTION OF Fx | | FOR DETECTION OF Fy | | FOR DETECTION OF Fz | | | |
| --- | --- | --- | --- | --- | --- | --- | --- | --- |
|  | D1 | $\overline{D2}$ | $\overline{D3}$ | D4 | $\overline{D5}$ | $\overline{D6}$ | D7 | D8 |
| Fx | + | + | 0 | 0 | + | − | 0 | 0 |
| Fy | 0 | 0 | + | + | 0 | 0 | + | − |
| Fz | + | − | + | − | + | + | + | + |

SENSOR USING PIEZOELECTRIC ELEMENTS

This is a divisional of application Ser. No. 08/267,044 filed on Jun. 28, 1994, U.S. Pat. No. 5,571,972.

BACKGROUND OF THE INVENTION

This invention relates to a sensor for force/acceleration/magnetism using piezoelectric elements and, more particularly, to a sensor capable of detecting force, acceleration or magnetism every multi-dimensional respective components.

In the automobile industry or machinery industry, etc., there has been an increased demand for sensors capable of precisely detecting physical action such as force, acceleration or magnetism. Particularly, compact sensors capable of detecting these physical actions every two-dimensional or three-dimensional respective components are being required.

As such a compact sensor, in the U.S. patent application No. 07/984,435 (European Patent Application No. 92914919.3), a novel sensor which has been developed by the same inventor as that of this application is disclosed. This novel sensor is of a structure such that plural detection elements each comprised of a piezoelectric element are prepared and such detection elements are disposed on a flexible substrate, whereby when an external force is applied to a working body attached on the flexible substrate, bending takes place in the flexible substrate. This bending is transmitted to the piezoelectric element. In the piezoelectric element, charges corresponding to the bending are produced. It is thus the fundamental principle of this sensor that there is employed a method of detecting an applied external force on the basis of the charges produced. Since the manner of how bending takes place varies in dependency upon the direction of an applied external force, the state where charges are produced with respect to a plurality of piezoelectric elements arranged at respective predetermined positions is detected, thereby making it possible to detect the magnitude and the direction of the applied external force.

In the above-described sensor using piezoelectric element, four detection elements are required for the purpose of detecting a force applied in one axial direction. Accordingly, at least eight detection elements are required for the two-dimensional force sensor, and at least twelve detection elements are required for the three-dimensional force sensor. Accordingly, there is the problem that the structure becomes complicated since a large number of detection elements should be arranged on a single flexible substrate. In addition, each detection element has two electrodes of an upper electrode and an lower electrode. Therefore, if independent wirings are respectively implemented to these respective electrodes, the wiring pattern also becomes very complicated.

SUMMARY OF THE INVENTION

With the above in view, an object of this invention is to provide a sensor using piezoelectric elements which can be of a simpler structure.

(1) The first feature-of the present invention is to provide a force sensor using piezoelectric elements comprising:

a substrate having flexibility wherein an origin is defined at a point within the substrate and an X-axis and a Y-axis extending in a direction in parallel to a principle surface of the substrate are defined, the X-axis and the Y-axis being crossing perpendicular to each other at the origin to form an XY coordinate system;

four detection elements composed of a piezoelectric element in a plate form, an upper electrode formed on an upper surface of the piezoelectric element and a lower electrode formed on a lower surface of the piezoelectric element,- respective one of the upper electrode and the lower electrode being fixed to the substrate;

a working body having a function for transmitting, to the origin, a force produced on the basis of a physical action exerted from an external and;

a sensor casing to which an outside peripheral portion of the substrate is fixed;

wherein a first detection element, a second detection element, a third detection element and a fourth detection element are respectively arranged in a negative region on the X-axis, in a positive region on the X-axis, in a negative region on the Y-axis and in a positive region on the Y-axis, respectively;

wherein a force relating to the X-axis direction produced in the working body is detected on the basis of charges produced in the first detection element and the second detection element, and a force relating to the Y-axis direction produced in the working body is detected on the basis of charges produced in the third detection element and the fourth detection element.

(2) The second feature of the present invention is to provide a force sensor using piezoelectric elements as described in the first feature:

wherein an inside annular region to surround the origin from a periphery and an outside annular region to surround the inside annular region further from a periphery thereof are defined;

wherein a first detection element is arranged in a region extending over the second and third quadrants of the XY coordinate system within the outside annular region;

wherein a second detection element is arranged in a region extending over the first and fourth quadrants of the XY coordinate system within the outside annular region;

wherein a third detection element is arranged in a region extending over the third and fourth quadrants of the XY coordinate system within the inside annular region; and wherein a fourth detection element is arranged in a region extending over the first and second quadrants of the XY coordinate system within the inside annular region.

(3) The third feature of the present invention is to provide a force sensor using piezoelectric elements comprising:

a substrate having flexibility wherein an origin is defined at a point within the substrate, an X-axis and a Y-axis extending in a direction in parallel to a principle surface of the substrate are defined, the X-axis and the Y-axis being crossing perpendicular to each other at the origin to form an XY coordinate system, a Z-axis passing through the origin and perpendicular to an XY-plane passing through the origin is defined, and a fourth axis passing through the origin and extending along the XY-plane is defined;

six detection elements composed of a piezoelectric element in a plate form, an upper electrode formed on an upper surface of the piezoelectric element and a lower electrode formed on a lower surface of the piezoelectric element, respective one of the upper electrode and the lower electrode being fixed to the substrate;

a working body having a function for transmitting, to the origin, a force produced on the basis of a physical action exerted from an external and;

a sensor casing to which an outside peripheral portion of the substrate is fixed;

wherein a first detection element, a second detection element, a third detection element a fourth detection element, a fifth detection element and a sixth detection element are respectively arranged in a negative region on the X-axis, in a positive region on the X-axis, in a negative region on the Y-axis, in a positive region on the Y-axis, in a negative region on the fourth axis and in a positive region on the fourth axis, respectively;

wherein a force relating to the X-axis direction produced in the working body is detected on the basis of charges produced in the first detection element and the second detection element, a force relating to the Y-axis direction produced in the working body is detected on the basis of charges produced in the third detection element and the fourth detection element and a force relating to the Z-axis direction produced in the working body is detected on the basis of charges produced in the fifth detection element and sixth detection element.

(4) The fourth feature of the present invention is to provide a force sensor using piezoelectric elements as described in the third feature, wherein the X-axis is used as the fourth axis.

(5) The fifth feature of the present invention is to provide a force sensor using piezoelectric elements as described in the fourth feature, wherein an inside annular region to surround the origin from a periphery and an outside annular region to surround the inside annular region further from a periphery thereof are defined on the XY-plane;

wherein the first detection element is arranged in a region extending over the second and third quadrants of the XY coordinate system within the outside annular region;

wherein the second detection element is arranged in the region extending over the first and fourth quadrants of the coordinate system within the outside annular region;

wherein the third detection element is arranged in a region extending over the third and fourth quadrants of the XY coordinate system within the inside annular region;

wherein the fourth detection element is arranged in a region extending over the first and second quadrants of the XY coordinate system within the inside annular region;

wherein the fifth detection element is arranged in a negative region on the X-axis within the inside annular region so that it is positioned between the third and the fourth detection elements, and wherein sixth detection element is arranged in a positive region on the X-axis within the inside annular region so that it is positioned between the third and the fourth detection elements.

(6) The sixth feature of the present invention is to provide a force sensor using piezoelectric elements as described in the fourth feature:

wherein an inside annular region to surround the origin from a periphery and an outside annular region to surround the inside annular region further from a periphery thereof are defined on the XY-plane;

wherein a first detection element is arranged in a region extending over the first and second quadrants of the XY coordinate system within the outside annular region;

wherein a second detection element is arranged in a region extending over the third and fourth quadrants of the XY coordinate system within the outside annular region;

wherein a third detection element is arranged in a region extending over the second and third quadrants of the XY coordinate system within the inside annular region;

wherein a fourth detection element is arranged in a region extending over the first and fourth quadrants of the XY coordinate system within the inside annular region;

wherein a fifth detection element is arranged in a negative region on the X-axis within the outside annular region so that it is positioned between the first and the second detection elements, and wherein a sixth detection element is arranged in a positive region on the X-axis within the outside annular region so that it is positioned between the first and the second detection elements.

(7) The seventh feature of the present invention is to provide a force sensor using piezoelectric elements as described in the fifth feature:

wherein a seventh detection element and an eighth detection element are further provided in addition;

wherein the seventh detection element is arranged in the negative region on the Y-axis within the outside annular region so that it is positioned between the first and the second detection elements;

wherein the eighth detection element is arranged in the positive region on the Y-axis within the outside annular region so that it is positioned between the first and the second detection elements; and wherein a force relating to the Z-axis direction produced in the working body is detected on the basis of charges produced in the fifth to the eighth detection elements.

(8) The eighth feature of the present invention is to provide a force sensor using piezoelectric elements comprising:

a substrate having flexibility wherein an origin is defined at a point within the substrate and an X-axis and a Y-axis extending in a direction in parallel to a principle surface of the substrate are defined, the X-axis and the Y-axis being crossing perpendicular to each other at the origin to form an XY coordinate system;

four detection elements composed of a piezoelectric element in a plate form, an upper electrode formed on an upper surface of the piezoelectric element and a lower electrode formed on a lower surface of the piezoelectric element, respective one of the upper electrode and the lower electrode being fixed to the substrate;

a working body having a function for transmitting, to an outside peripheral portion of the substrate, a force produced on the basis of a physical action exerted from an external and;

a sensor casing to which a vicinity of the origin is fixed;

wherein a first detection element, a second detection element, a third detection element and a fourth detection element are respectively arranged in a negative region on the X-axis, in a positive region on the X-axis, in a negative region on the Y-axis and in a positive region on the Y-axis, respectively;

wherein a force relating to the X-axis direction produced in the working body is detected on the basis of charges produced in the first detection element and the second detection element, and a force relating to the Y-axis direction produced in the working body is detected on the basis of charges produced in the third detection element and the fourth detection element.

(9) The ninth feature of the present invention is to provide a force sensor using piezoelectric elements as described in the eighth feature:

wherein an inside annular region to surround the origin from a periphery and an outside annular region to surround the inside annular region further from a periphery thereof are defined;

wherein a first detection element is arranged in a region extending over the second and third quadrants of the XY coordinate system within the outside annular region;

wherein a second detection element is arranged in a region extending over the first and fourth quadrants of the XY coordinate system within the outside annular region;

wherein a third detection element is arranged in a region extending over the third and fourth quadrants of the XY coordinate system within the inside annular region; and wherein a fourth detection element is arranged in a region extending over the first and second quadrants of the XY coordinate system within the inside annular region.

(10) The tenth feature of the present invention is to provide a force sensor using piezoelectric elements comprising:

a substrate having flexibility wherein an origin is defined at a point within the substrate, an X-axis and a Y-axis extending in a direction in parallel to a principle surface of the substrate are defined, the X-axis and the Y-axis being crossing perpendicular to each other at the origin to form an XY coordinate system, a Z-axis passing through the origin and perpendicular to an XY-plane passing through the origin is defined, and a fourth axis passing through the origin and extending along the XY-plane is defined;

six detection elements composed of a piezoelectric element in a plate form, an upper electrode formed on an upper surface of the piezoelectric element and a lower electrode formed on a lower surface of the piezoelectric element, respective one of the upper electrode and the lower electrode being fixed to the substrate;

a working body having a function for transmitting, to an outside peripheral portion of the substrate, a force produced on the basis of a physical action exerted from an external and;

a sensor casing to which a vicinity of the origin is fixed;

wherein a first detection element, a second detection element, a third detection element a fourth detection element, a fifth detection element and a sixth detection element are respectively arranged in a negative region on the X-axis, in a positive region on the X-axis, in a negative region on the Y-axis, in a positive region on the Y-axis, in a negative region on the fourth axis and in a positive region on the fourth axis, respectively;

wherein a force relating to the X-axis direction produced in the working body is detected on the basis of charges produced in the first detection element and the second detection element, a force relating to the Y-axis direction produced in the working body is detected on the basis of charges produced in the third detection element and the fourth detection element and a force relating to the Z-axis direction produced in the working body is detected on the basis of charges produced in the fifth detection element and sixth detection element.

(11) The eleventh feature of the present invention is to provide a force sensor using piezoelectric elements as described in the tenth feature, wherein the X-axis is used as the fourth axis.

(12) The twelfth feature of the present invention is to provide a force sensor using piezoelectric elements as described in the eleventh feature:

wherein an inside annular region to surround the origin from a periphery and an outside annular region to surround the inside annular region further from a periphery thereof are defined on the XY-plane;

wherein the first detection element is arranged in a region extending over the second and third quadrants of the XY coordinate system within the outside annular region;

wherein the second detection element is arranged in the region extending over the first and fourth quadrants of the XY coordinate system within the outside annular region;

wherein the third detection element is arranged in a region extending over the third and fourth quadrants of the XY coordinate system within the inside annular region;

wherein the fourth detection element is arranged in a region extending over the first and second quadrants of the XY coordinate system within the inside annular region;

wherein the fifth detection element is arranged in a negative region on the X-axis within the inside annular region so that it is positioned between the third and the fourth detection elements, and wherein sixth detection element is arranged in a positive region on the X-axis within the inside annular region so that it is positioned between the third and the fourth detection elements.

(13) The thirteenth feature of the present invention is to provide a force sensor using piezoelectric elements as described in the eleventh feature, wherein an inside annular region to surround the origin from a periphery and an outside annular region to surround the inside annular region further from a periphery thereof are defined on the XY-plane;

wherein a first detection element is arranged in a region extending over the first and second quadrants of the XY coordinate system within the outside annular region;

wherein a second detection element is arranged in a region extending over the third and fourth quadrants of the XY coordinate system within the outside annular region;

wherein a third detection element is arranged in a region extending over the: second and third quadrants of the XY coordinate system within the inside annular region;

wherein a fourth detection element is arranged in a region extending over the first and fourth quadrants of the XY coordinate system within the inside annular region;

wherein a fifth detection element is arranged in a negative region on the X-axis within the outside annular region so that it is positioned between the first and the second detection elements, and wherein a sixth detection element is arranged in a positive region on the X-axis within the outside annular region so that it is positioned between the first and the second detection elements.

(14) The fourteenth feature of the present invention is to provide a force sensor using piezoelectric elements as described in the twelfth feature:

wherein a seventh detection element and an eighth detection element are further provided in addition;

wherein the seventh detection element is arranged in the negative region on the Y-axis within the outside annular region so that it is positioned between the first and the second detection elements;

wherein the eighth detection element is arranged in the positive region on the Y-axis within the outside annular region so that it is positioned between the first and the second detection elements; and wherein a force relating to the Z-axis direction produced in the working body is detected on the basis of charges produced in the fifth to the eighth detection elements.

(15) The fifteenth feature of the present invention is to provide a force sensor using piezoelectric elements as described in any one of the above features:

wherein predetermined polarization processing is implemented to piezoelectric elements of respective detection elements;

so that two detection elements for detecting a force relating to the X-axis direction, which are arranged on the opposite side each other with respect to the origin, have an opposite polarization characteristic each other;

so that two detection elements for detecting a force relating to the Y-axis direction, which are arranged on the opposite side each other with respect to the origin, have an opposite polarization characteristic each other; and so that two detection elements for detecting a force relating to the Z-axis direction, which are arranged on the opposite side each other with respect to the origin, have a same polarization characteristic each other.

(16) The sixteenth feature of the present invention is to provide a force sensor using piezoelectric elements as described in any one of the above features:

wherein piezoelectric elements of respective detection elements are constituted by a physically single common piezoelectric plate and respective portions of the common piezoelectric plate are utilized as individual piezoelectric elements constituting respective detection elements.

(17) The seventeenth feature of the present invention is to provide a force sensor using piezoelectric elements as described in any one of the above features:

wherein either a group of plural lower electrodes or a group of plural upper electrodes is constituted by a single electrode layer.

(18) The eighteenth feature of the present invention is to provide a force sensor using piezoelectric elements as described in the seventeenth feature:

wherein the substrate having flexibility is constituted by a conductive material and the substrate itself is used as the single electrode layer.

(19) The nineteenth feature of the present invention is to provide a force sensor using piezoelectric elements as described in any one of the above features:

wherein there are further provided four expanding/contracting elements, each of which comprises a piezoelectric element in a plate form, an upper electrode formed on an upper surface of the piezoelectric element and a lower electrode formed on a lower surface of the piezoelectric element, and the expanding/contracting elements expand or contract in a layer direction of the electrodes when a predetermined voltage is applied between the upper electrode and the lower electrode, respective one of the upper electrode and the lower electrode of the respective expanding/contracting elements being fixed to the substrate; and, wherein the first expanding/contracting element, the second expanding/contracting element, the third expanding/contracting element and the fourth expanding/contracting element are respectively arranged in a negative region on the X-axis, in a positive region on the X-axis, in a negative region on the Y-axis, and in a positive region on the Y-axis, so as to conduct test for the sensor by applying predetermined voltages across electrodes of the respective expanding/contracting elements to induce a displacement equivalent to the case where a force in a predetermined direction is applied to the working body.

(20) The twentieth feature of the present invention is to provide a force sensor using piezoelectric elements as described in any one of the above features:

wherein the working body has an enough weight to produce a force on the basis of an acceleration applied from an external, thereby making it possible to detect acceleration.

(21) The twenty first feature of the present invention is to provide a force sensor using piezoelectric elements as described in any one of the above features:

wherein the working body is made of magnetic material so as to produce a force on the basis of magnetism applied from an external, thereby making it possible to detect magnetism.

In the sensor having the above described features, it is sufficient for detecting a force applied in one axial direction to prepare two detection elements. Accordingly, it is sufficient for the two-dimensional force sensor to prepare four detection elements, and it is sufficient for the three-dimensional force sensor to prepare six detection elements. For this reason, the entire structure becomes very simple.

Moreover, since such an inside annular region to encompass the origin from the periphery and such an outside annular region to encompass the inside annular region further from the periphery thereof are defined on the XY-plane and respective detection elements are disposed along these annular regions, an efficient arrangement of detection elements can be made. Thus, a compact sensor having high sensitivity can be realized.

Further, such polarization processing to respectively vary polarization characteristics is carried out for every piezoelectric elements constituting respective detection elements, thereby making it possible to conveniently set polarities of charges produced on respective electrodes. For this reason, the wiring structures for respective electrodes can be simplified.

In addition, when a single common piezoelectric element common to respective detection elements is used, or a common electrode layer therefor is used, the structure is simplified. When a substrate of a conductive material is further used, the substrate itself can be utilized as a common electrode layer. Accordingly, the number of electrode layers can be reduced.

The present invention further provides a method for adding a self-diagnostic function to the sensor as well. The piezoelectric element has the property to produce charges on both electrodes by applying mechanical deformation and also has the opposite property that when a predetermined voltage is applied across the both electrodes, a mechanical deformation corresponding thereto is produced. In view of this, if an expanding/contracting element having the same structure as that of the detection element is disposed to apply a predetermined voltage to the extracting/contracting element, a deformation produced in the extracting/contracting element is transmitted to the substrate, thus making it possible to make up, in pseudo manner, the state equivalent to the state where a force is applied from the external. Accordingly, by diagnosing an output of the expanding/contracting element as the detection element in pseudo manner, test of the sensor can be made.

DESCRIPTION OF THE PREFERRED EMBODIMENTS

This invention will now be described in accordance with embodiments shown.

§1. Conventionally Proposed Sensor

Figure 1:
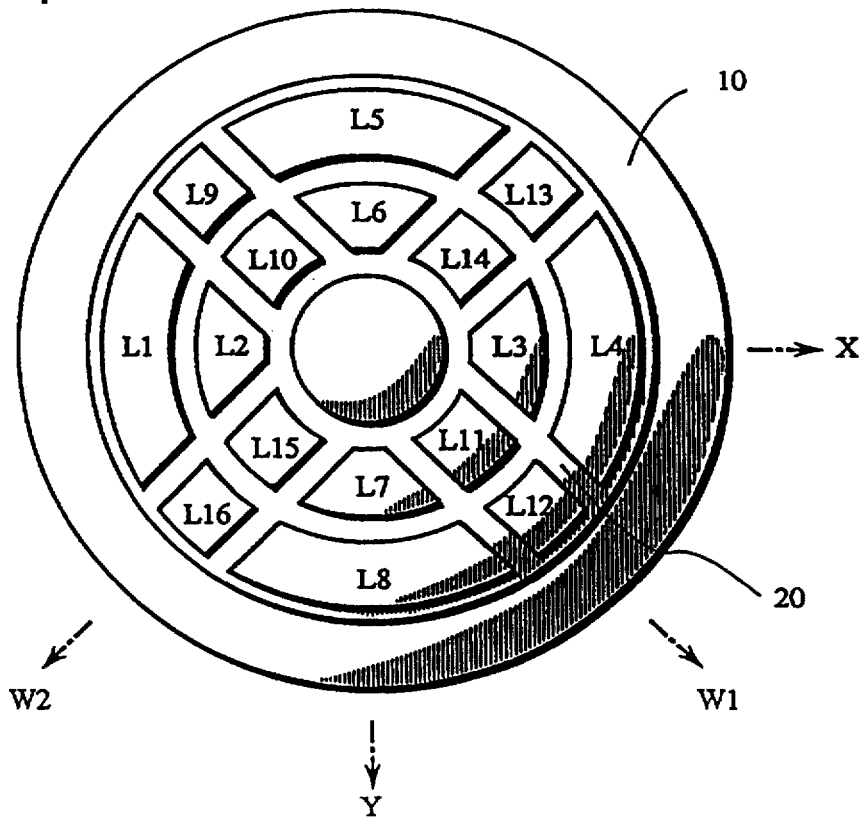
FIG. 1 is a top view of a prior sensor disclosed in the U.S. patent application No. 07/984,435 (European Patent Application No. 92914919.3).
Figure 2:
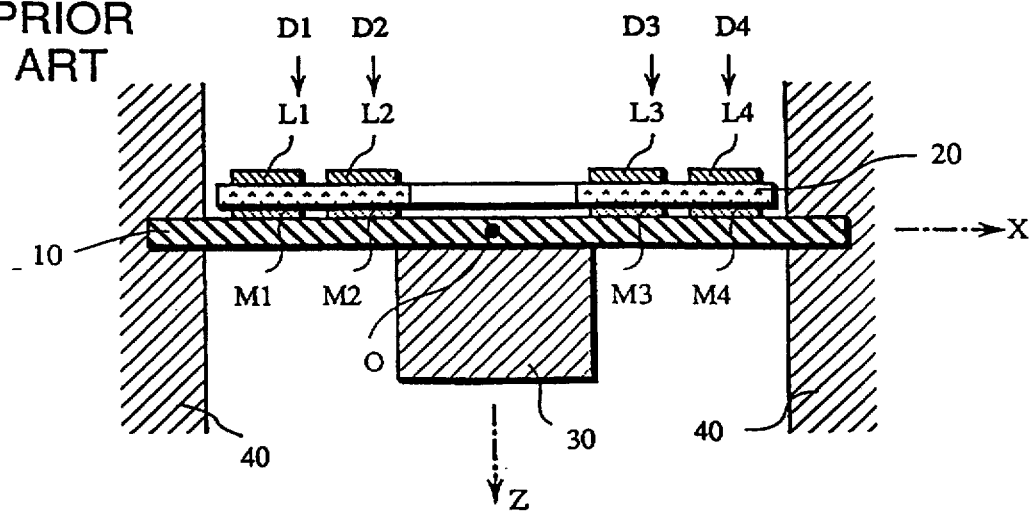
FIG. 2 is a side cross sectional view of the sensor of FIG. 1 (only the cross sectional portion is depicted with respect to each electrode layer).

Initially, for reference, the structure and the operation of a sensor disclosed in the U.S. patent application No. 07/984, 435 (European Patent Application No. 92914919.3) will be briefly described. FIG. 1 is a top view of this conventional sensor. A flexible substrate 10 is a disk-shaped substrate having flexibility which functions as so called a diaphragm. On this flexible substrate 10, a doughnut disk-shaped (or washer-shaped) piezoelectric element 20 is disposed. On the upper surface of the piezoelectric element 20, sixteen upper electrode layers L1 to L16 in forms as shown are formed at positions shown, respectively. Further, on the lower surface of the piezoelectric element 20, sixteen lower electrode layers M1 to M16 (not shown in FIG. 1) which have exactly the same shapes as those of the upper electrode layers L1 to L16 are formed at positions opposite to the upper electrode layers L1 to L16, respectively. FIG. 2 is a side cross sectional view of this sensor (only the cross sectional portion is depicted with respect to each electrode layer for the purpose of avoiding complexity of the figure. This similarly applies to all the side cross sectional views). As clearly shown in this figure, the doughnut disk-shaped piezoelectric element 20 is in so called sandwich state where it is put between sixteen upper electrode layers L1 to L16 (only L1 to L4 are shown in FIG. 2) and sixteen lower electrode layers M1 to M16 (only M1 to M4 are shown in FIG. 2). Further, the lower surfaces of the lower electrode layers M1 to M16 are fixed on the upper surface of the flexible substrate 10. On the other hand, a working body 30 is fixed on the lower surface of the flexible substrate 10, and the peripheral portion of the flexible substrate 10 is fixedly supported by a sensor casing 40. In this embodiment, the flexible substrate 10 is constituted by an insulating material. In the case where the flexible substrate 10 is constituted by a conductive material such as metal, etc., an insulating film is formed on the upper surface thereof to thereby prevent sixteen lower electrode layers M1 to M16 from being short-circuited.

For convenience of explanation, let now consider an XYZ three-dimensional coordinate system in which the center position O of flexible substrate 10 is caused to be the origin. Namely, in FIG. 1, an X-axis, a Y-axis and a Z-axis are defined in the right direction, in the lower direction, and in a direction perpendicular to plane surface of paper, respectively. FIG. 2 is a cross sectional view cut along the XZ plane of this sensor. Flexible substrate 10, piezoelectric element 20, and respective electrode layers L1 to L16, M1 to M16 are all arranged in parallel to the XY-plane. Further, as shown in FIG. 1, on the XY-plane, a W1-axis and a W2-axis are respectively defined in directions to form 45 degrees relative to the X-axis or the Y-axis. These W1 and W2 axes are both passed through the origin O. When such a coordinate system is defined, upper electrode layers L1 to L4 and lower electrode layers M1 to M4 are arranged in order from the negative direction of the X-axis toward the positive direction thereof. Further, upper electrode layers L5 to L8 and lower electrode layers M5 to M8 are arranged in order from the negative direction of the Y-axis toward the positive direction thereof, and upper electrode layers L9 to L12 and lower electrode layers M9 to M12 are arranged in order from the negative direction of the W1-axis toward the positive direction thereof. In addition, upper electrode layers L13 to L16 and lower electrode layers M13 to M16 are arranged in order from the negative direction of the W2-axis toward the positive direction thereof.

Figure 3:
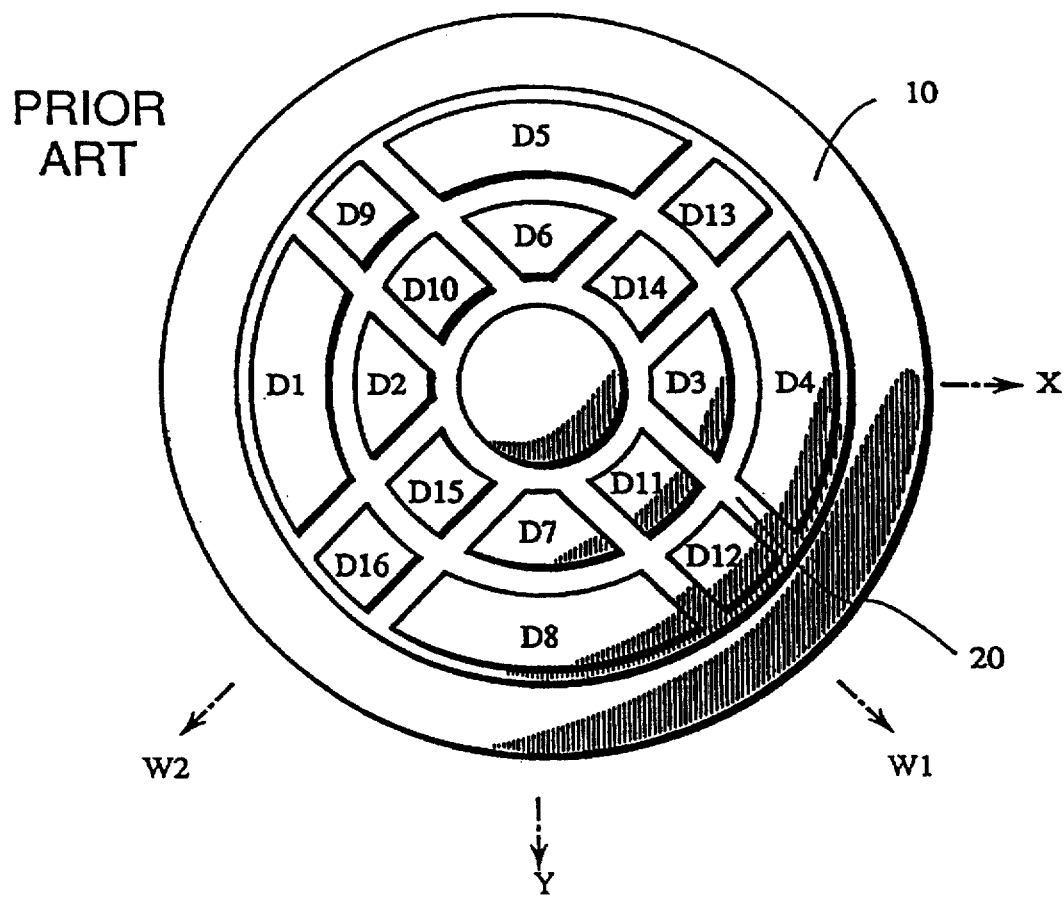
FIG. 3 is a top view showing an arrangement of sixteen detection elements D1 to D16 in the sensor of FIG. 1.

It is well known that the piezoelectric element has the property that when electrode layers are respectively formed on the upper and lower surfaces of the piezoelectric element, and a predetermined voltage is applied across this pair of electrode layers, a predetermined; pressure is produced within the piezoelectric element, while when a predetermined force is applied to the piezoelectric element, a predetermined voltage is produced across the pair of electrode layers. It is now assumed that sixteen detection elements D1 to D16 are respectively formed by the sixteen upper electrode layers L1 to L16, the sixteen lower electrode layers M1 to M16 which have been described above, and sixteen portions of piezoelectric element 20 put therebetween. For example, detection element D1 is formed by upper electrode layer L1, lower electrode layer M1, and a portion of piezoelectric element 20 put therebetween. Eventually, sixteen detection elements D1 to D16 are arranged as indicated by the top view of FIG. 3.

Figure 4A:
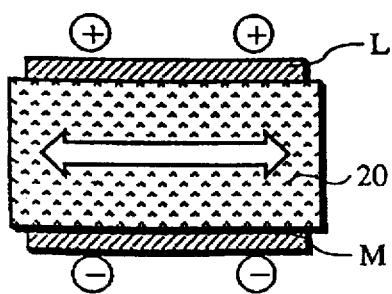
FIGS. 4a and 4b are views showing the polarization characteristic (type I) of piezoelectric element 20 in the sensor of FIG. 1.
Figure 4B:
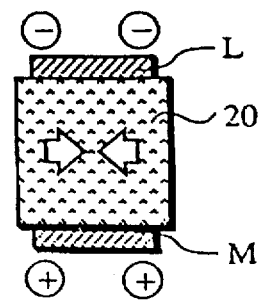

Now it is assumed that a piezoelectric ceramic material having a polarization characteristic as shown in FIGS. 4a and 4b is used as the piezoelectric element 20 in this sensor. Namely, the piezoelectric element has the polarization characteristic that in the case where a force in a direction to expand along the XY-plane is exerted as shown in FIG. 4a, positive charges and negative charges are respectively produced on the upper electrode layer L and on the lower electrode layer M, while in the case where a force in a direction to contract along the XY-plane is exerted as shown in FIG. 4b, negative and positive charges are respectively produced on the upper electrode layer L and on the lower electrode layer M. It is now assumed that such a polarization characteristic is called type I. Thus, sixteen detection elements D1 to D16 in this sensor all have piezoelectric element having the polarization characteristic of the type I.

Figure 5:
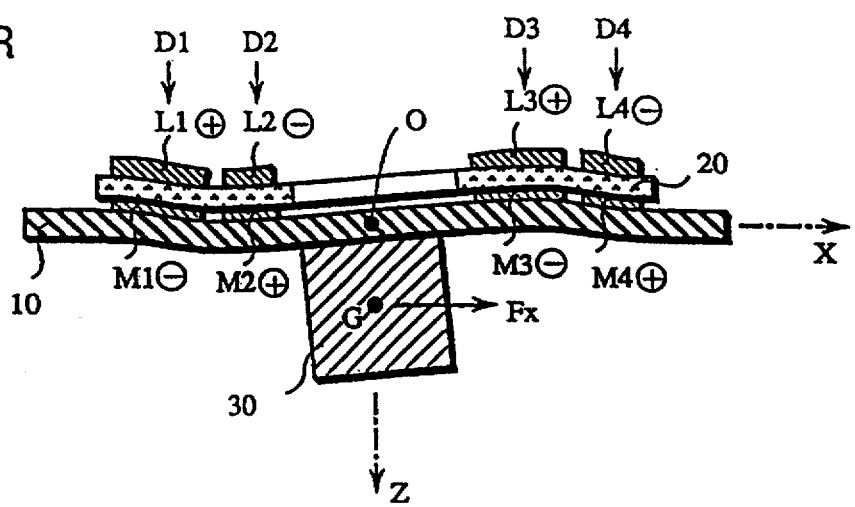
FIG. 5 is a side cross sectional view showing the state where force Fx in the X-axis direction is applied to the center of gravity G of the working body 30 of the sensor of FIG. 1 (only the cross sectional portion is depicted with respect to each electrode layer).

What phenomenon takes place in the case where an external force in a predetermined direction is applied to working body 30 in this sensor will now be described. Let first consider the case where force Fx in the X-axis direction is applied to the center of gravity G of working body 30. By action of such a force Fx, bending takes place in the flexible substrate 10 which performs the function of diaphragm. Thus, a deformation as shown in FIG. 5 takes place. As a result, detection elements D1, D3 arranged along the X-axis expand in the X-axis direction, and detection elements D2, D4 similarly arranged along the X-axis contract in the X-axis direction. Since these piezoelectric elements have a polarization characteristic as shown in FIG. 4, charges of polarity as indicated by symbols "+" and "−" encompassed by small circles in FIG. 5 are produced. In addition, in the case where force Fy in the Y-axis direction is applied, charges having predetermined polarities are similarly produced with respect to respective electrode layers constituting detection elements D5 to D8 arranged along the Y-axis.

Figure 6:
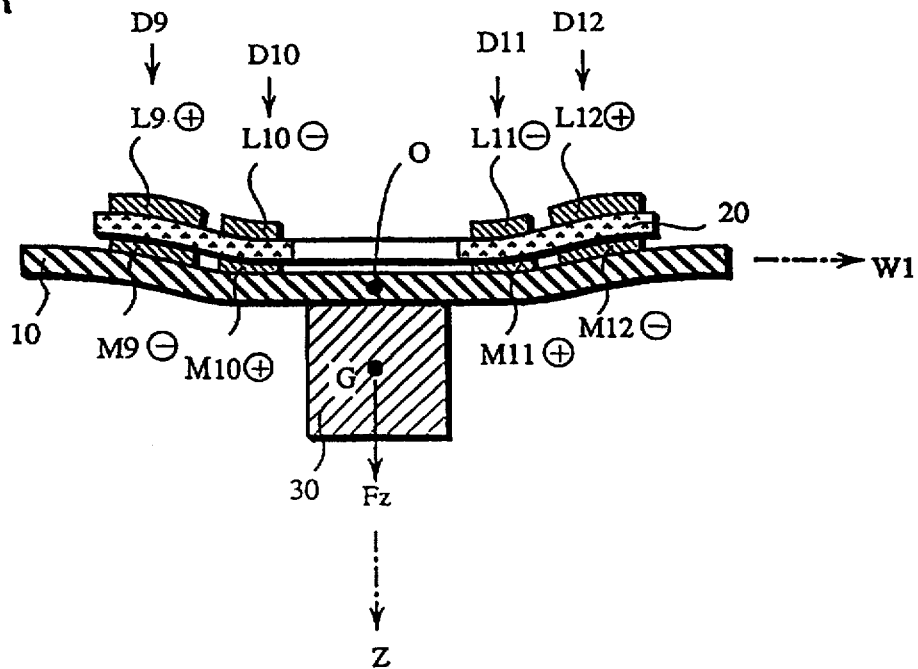
FIG. 6 is a side cross sectional view showing the state where force Fz in the Z-axis direction is applied to the center of gravity G of the working body 30 of the sensor of FIG. 1 (only the cross sectional portion is depicted with respect to each electrode layer).

Let now consider the case where force Fz in the Z-axis direction is applied. In this case, flexible substructure 10 which performs the function of the diaphragm is deformed as shown in FIG. 6, so detection elements D9, D12 arranged along the W1-axis expand, and detection elements D10, D11 similarly arranged along the W1-axis contract. For this reason, charges of polarities as indicated by symbols "+" and "−" encompassed by small circles in FIG. 6 are produced. Also in respective electrode layers constituting detection elements D13 to D16 arranged along the W2-axis, charges having predetermined polarities are similarly produced.

By making use of such phenomenon, charges produced in respective electrode layers are detected, thereby making it possible to detect force components exerted in respective axes directions. Namely, for detecting force Fx in the X-axis direction, it is sufficient to detect charges produced in detection elements D1 to D4. For detecting force Fy in the Y-axis direction, it is sufficient to detect charges produced in detection elements D5 to D8. For detecting force Fz in the Z-axis direction, it is sufficient to detect charges produced in detection elements D9 to D16. However, there is the problem that since four detection elements are used for detecting a force in one axial direction in the conventional sensor as stated above, the entire structure becomes complicated.

§2. Embodiment Of Sensor According To This Invention

Figure 7:
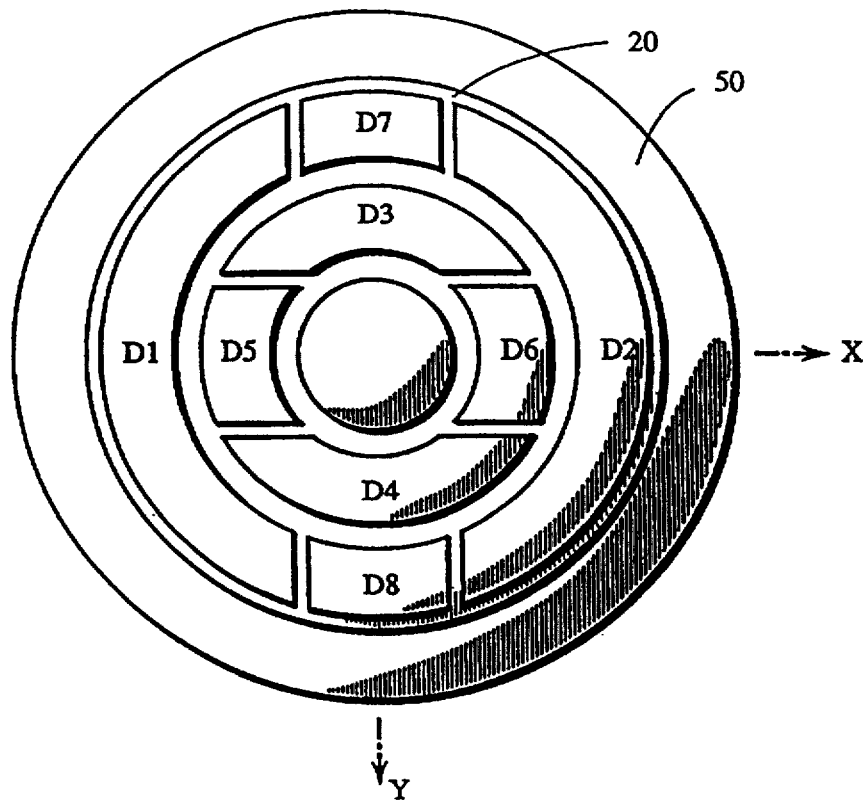
FIG. 7 is a top view of a three-dimensional force sensor according to an embodiment of this invention.
Figure 8:
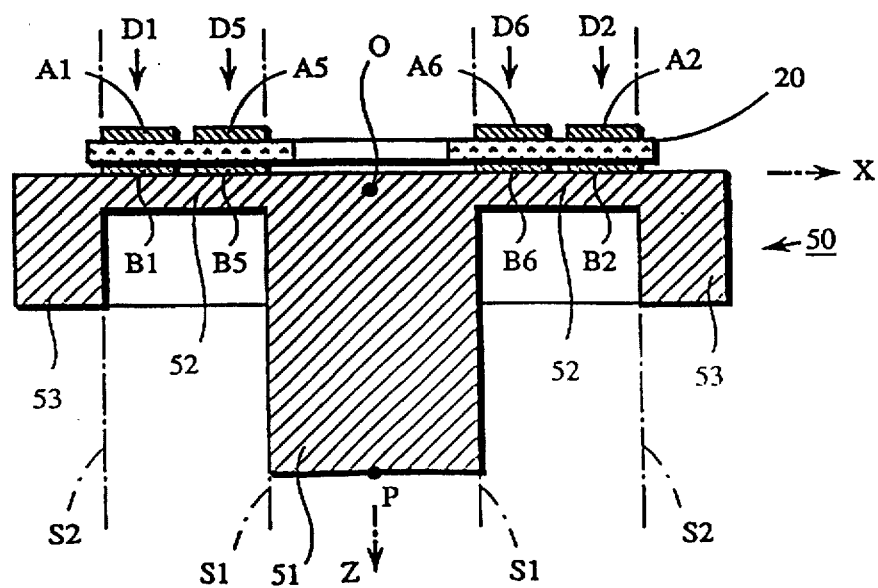
FIG. 8 is a side cross sectional view of the sensor of FIG. 7 (only the cross sectional portion is depicted with respect to each electrode layer).

The top view and the side cross sectional view of a force sensor according to an embodiment of this invention are respectively shown in FIGS. 7 and 8. A strain generative body 50 is a disk-shaped member as a whole, and the upper surface portion thereof performs the function as flexible substrate 10 in the previously described sensor. A working portion 51 at the central portion is a columnar portion projected downward and performs the function as working body 30 in the previously described sensor. Around the working portion 51, a doughnut shaped groove is dug. The portion above the groove is thin in thickness. In this embodiment, the thin portion in thickness is called a flexible portion 52. Further, the peripheral portion of the flexible portion 52, i.e., the outer circumferential portion of the strain generative body 50 is called a fixed portion 53. As stated above, the strain generative body 50 is composed of the working portion 51 at the central portion, the flexible portion 52 at the peripheral portion of the working portion 51, and the fixed portion 53 at the peripheral portion of the flexible portion 52. The flexible portion 52 is a portion literally having "flexibility" by the thin of the thickness. When a force is applied to a predetermined position (e.g., working point P shown in FIG. 8) of working body 51 in the state where fixed portion 53 is fixed to the sensor casing, mechanical deformation takes place in the flexible portion 52. In this way, the upper surface portion of strain generative body 50 performs the function as flexible substrate 10 in the previously described sensor.

A doughnut disk-shaped piezoelectric element 20 is disposed on strain generative body 50. This piezoelectric element 20 is, similarly to the previously described sensor, a piezoelectric ceramic material having a polarization characteristic of the type I as shown in FIG. 4. Further, similarly to the previously described sensor, upper electrode layers and lower electrode layers are formed on the upper and lower surfaces of the piezoelectric element 20 so that individual detection elements are formed. It is to be noted that, in this sensor, an arrangement of detection elements is different from that of the previously described sensor. While sixteen detection elements in total are provided in the previously described sensor, eight detection elements D1 to D8 are merely provided as indicated by the top view of FIG. 7 in the sensor of this embodiment. Respective detection elements are composed of upper electrode layers A1 to A8, lower electrode layers B1 to B8, and portions of piezoelectric element 20 put therebetween. The shape and the arrangement of the upper electrode layers A1 to A8 and the lower electrode layers B1 to B8 are the same. The plain view of the upper electrode layers A1 to A8 is shown in FIG. 7 (In the top view of FIG. 7, the layers actually visible are the upper electrode layers A1 to A8, however, these visible electrode layers are indicated with reference D1 to D8 in the figure, since the arrangement of the detection elements is important to explain the invention.) It is to be noted that, in the side cross sectional view of FIG. 8, for avoiding complexity of the figure, only the cross sectional portions are depicted with respect to these electrode layers. While, in this embodiment, strain generative body 50 is constituted by insulating material, in the case where it is constituted by conductive material such as metal, etc., an insulating film may be formed on the upper surface thereof to thereby prevent eight lower electrode layers B1 to B8 from being short-circuited.

Let now consider, for convenience of explanation, an XYZ three-dimensional coordinate system in which the central position 0 shown in FIG. 8 is caused to be the origin. Namely, in FIG. 8, an X-axis, a Z-axis and a Y-axis are respectively defined in the right direction, in the lower direction, and in a direction perpendicular to the plane surface of paper. The upper surface of strain generative body 50, piezoelectric element 20, and respective electrode layers A1 to A8, B1 to B8 are all disposed in parallel to the XY-plane. The shape and the arrangement of respective detection elements D1 to D8 (in other words, the shape and the arrangement of respective electrode layers A1 to A8, B1 to B8) are one of the feature of this invention. As indicated by the top view of FIG. 7, detection elements D1, D8, D2, D7 are arranged along an annular zone (hereinafter referred to as an outside annular region), and detection elements D5, D4, D6, D3 are arranged along another annular zone positioned inside (hereinafter referred to as an inside annular region). By disposing respective detection elements (i.e., respective electrode layers) along the inside annular region and the outside annular region defined so as to surround the origin O in this way, very efficient detections can be made. It is to be noted that, as indicated by single dotted lines in FIG. 8, the outer circumferential portion of respective electrode layers arranged in the outside annular region is caused to be in line with the outer circumferential portion (the outside wall portion of doughnut shaped groove: single dotted lines S2) of flexible portion 52, and the inner circumferential portion of respective electrode layers arranged in the inside annular region is caused to be in line with the inner circumferential portion (inner wall portion of doughnut shaped groove: single dotted lines S1) of flexible portion 52. This alignment is preferable in carrying out detection with high sensitivity.

The reason why a doughnut disk-shaped element having a circular opening window formed at the central portion is used as the piezoelectric element 20 in this embodiment is to easily carry out the above-described positioning or alignment by using this opening window. In the case where another method capable of carrying out precise positioning or alignment without utilizing such circular opening window can be carried out, a disk-shaped piezoelectric element 20 having no opening window may be used.

Figure 9:
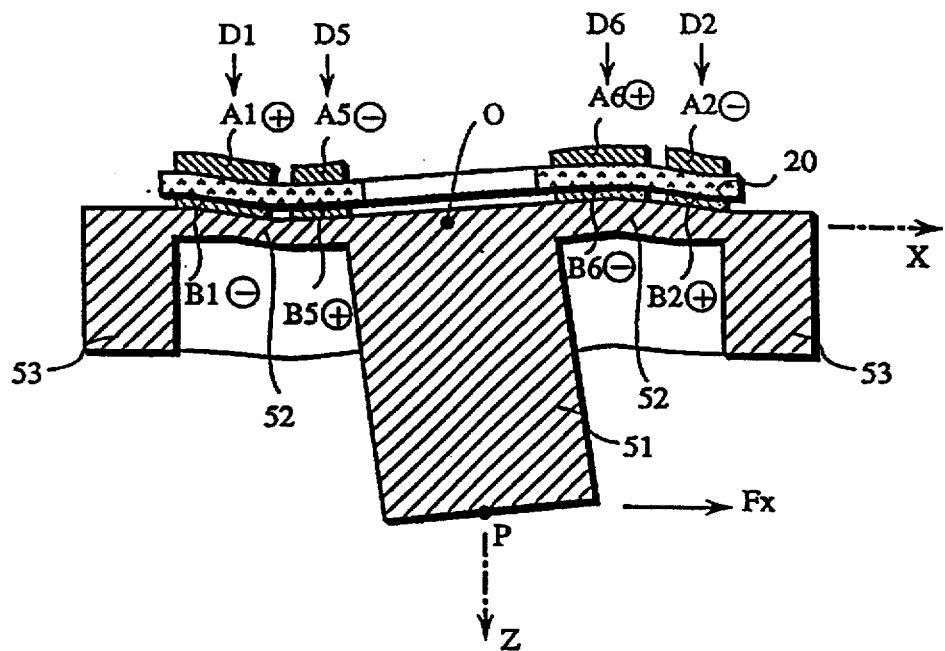
FIG. 9 is a side cross sectional view showing the state where force Fx in the X-axis direction is applied to the working point P of the sensor of FIG. 7 (only the cross sectional portion is depicted with respect to each electrode layer).

Explanation will now be given as to what phenomenon takes place in the case where an external force in a predetermined direction is applied to the working point P defined on the bottom surface of the working portion 51 with the fixed portion 53 being fixed to the sensor casing of the sensor. Let first consider the case where force Fx in the X-axis direction is applied to the working point P as shown in FIG. 9. By action of such a force Fx, bending occurs in the flexible portion 52. Thus, a deformation as shown in FIG. 9 takes place. As a result, the detection elements D1, D6 arranged along the X-axis expand in the X-axis direction, and the detection elements D5, D2 similarly arranged along the X-axis contract. Since the piezoelectric element put between these respective electrode layers has polarization characteristic as shown in FIG. 4, charges of polarities, as indicated by symbols "+" and "−" encompassed by small circles in FIG. 9 are produced in these respective electrode layers. Further, in the case where force Fy in the Y-axis direction is applied to the working point P, bending similarly takes place in the flexible portion 52. Since the detection elements D7, D4 arranged along the Y-axis expand in the Y-axis direction, charges of "+" and charges of "−" are respectively produced on the upper electrodes and on the lower electrodes. On the other hand, since the detection elements D3, D8 similarly arranged along the Y-axis contract in the Y-axis direction, charges of "−" and charges of "+" are respectively produced on the upper electrodes and on the lower electrodes.

Figure 10:
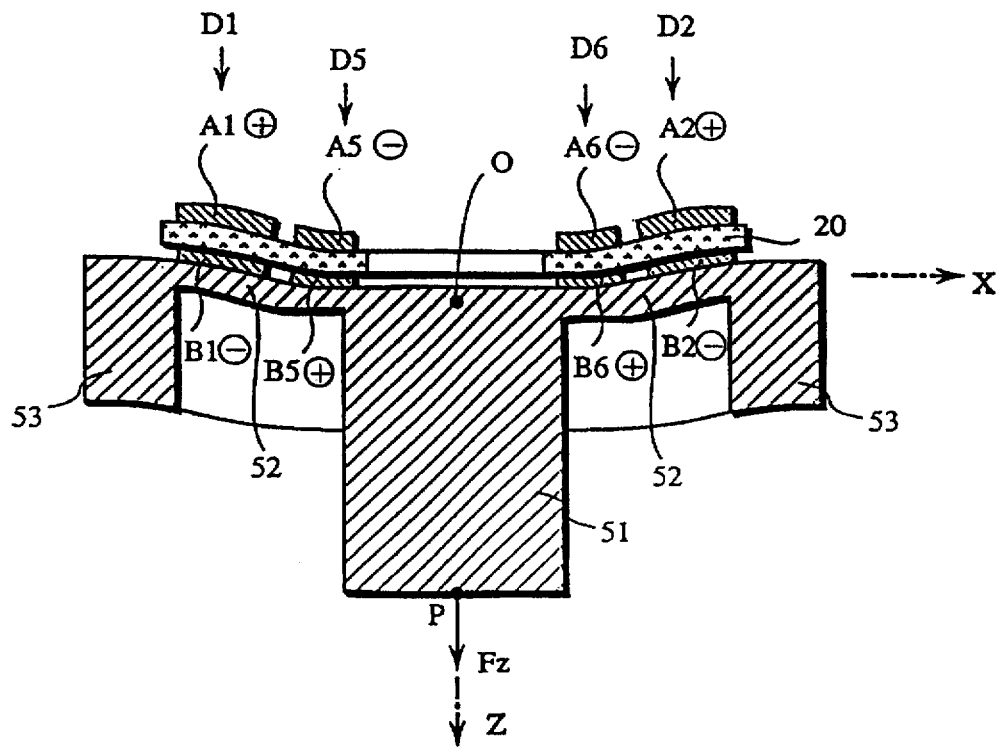
FIG. 10 is a side cross sectional view showing the state where force Fz in the Z-axis direction is applied to the working point P of the sensor of FIG. 7 (only the cross sectional portion is depicted with respect to each electrode layer).

Let now consider the case where force Fz in the Z-axis direction is applied. In this case, the flexible portion 52 is deformed as shown in FIG. 10. Since the detection elements D1, D8, D2, D7 arranged in the outside annular region expand, charges of "+" and charges of "−" are respectively produced on the upper electrodes and on the lower electrodes. On the other hand, since the detection elements D5, D4, D6, D3 arranged in the inside annular region contract, charges of "−" and charges of "+" are respectively produced on the upper electrodes and on the lower electrodes.

Figures 11, 12:
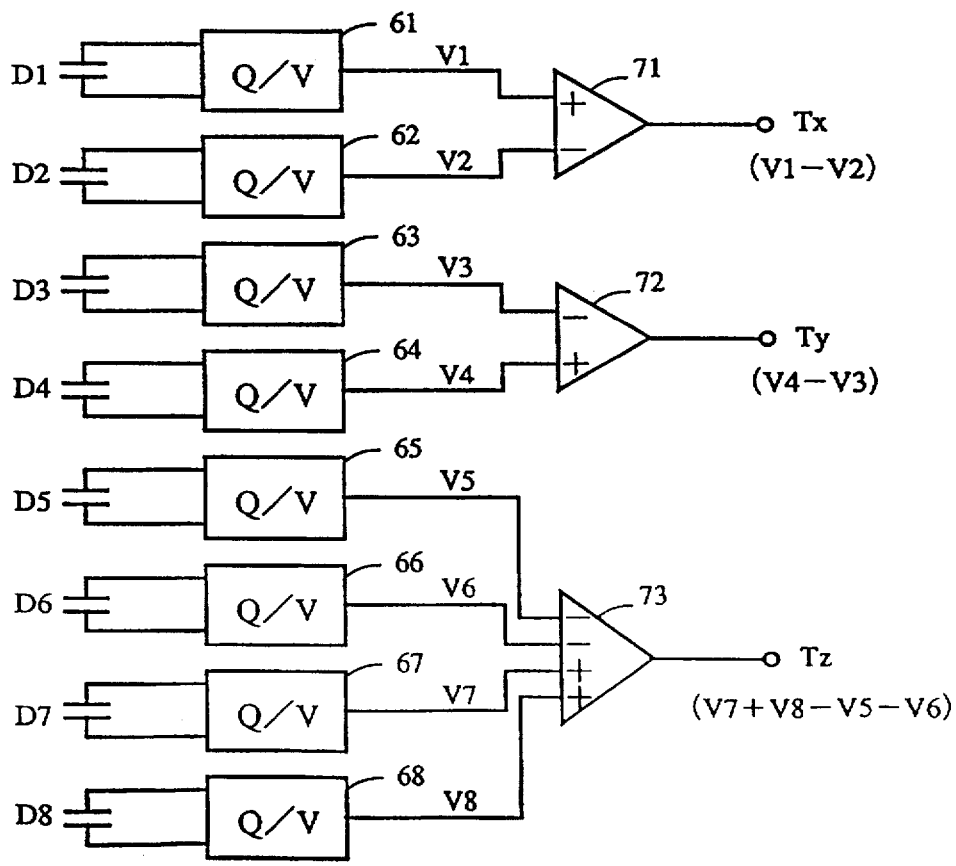
FIG. 11 is a table showing polarities of charges produced on the upper electrode of respective detection elements D1 to D8 when force components Fx, Fy, Fz in respective axes directions are applied to the sensor of FIG. 7.
FIG. 12 is a circuit diagram showing an example of a detecting circuit used in the sensor of FIG. 7.

A table shown in FIG. 11 indicates polarities of charges produced on the upper electrodes of respective detection elements in the case where force components Fx, Fy, Fz are respectively applied. Symbol "0" in the table indicates that no charge is produced as a whole as the result of the fact that the piezoelectric element partially expands while it partially contracts, so quantities of expansion and contraction which have the relationship of plus and minus are canceled. Further, polarities of charges produced on the lower electrodes are opposite to those of this table. In addition, also when force components -Fx, -Fy, -Fz in the opposite direction are applied, there appear charges having polarities opposite to those of this table, respectively. Why such table is obtained can be easily understood by making reference to the deformed states shown in FIGS. 9 and 10 and the arrangement of respective detection elements shown in FIG. 7. The sensor of this embodiment detects force Fx by the detection elements D1, D2, detects force Fy by the detection elements D3, D4, and detects force Fz by the detection elements D5 to D8.

§3. Example Of Detecting Circuit Of Sensor According To This Invention

For the purpose of carrying out detection of force by using the above-described sensor, it is sufficient to prepare a detecting circuit as shown in FIG. 12. In this detecting circuit, Q/V converting circuits 61 to 68 are respectively circuits for converting quantities of charges produced on both the upper and lower electrodes of respective detection elements D1 to D8 to voltage values. For example, in the case where charges of "+" and charges of "−" are respectively produced on the upper electrode layer and on the lower electrode layer, a positive voltage (with respect to the ground potential) corresponding to a quantity of charges produced is outputted from any circuits mentioned above. In contrast, in the case where charges of "−" and charges of "+" are respectively produced on the upper electrode layer and on the lower electrode layer, a negative voltage (with respect to the ground potential) corresponding to a quantity of charges produced is outputted from any circuits mentioned above. Voltages V1 to V8 outputted in this way are delivered to operation elements 71 to 73. Outputs of these operation elements 71 to 73 are obtained at terminals Tx, Ty, Tz. In this instance, a voltage value with respect to the ground potential of the terminal Tx comes to a detection value of Fx, a voltage value with respect to the ground potential of the terminal Ty comes to a detection value of Fy, and a voltage value with respect to the ground potential of the terminal Tz comes to a detection value of Fz.

It is seen that voltage values obtained at the respective output terminals Tx, Ty, Tz come to detection values of force components Fx, Fy, Fz by making reference to the table of FIG. 11. For example, in the case where force Fx is exerted, charges of "+" are produced on the upper electrode layer of the detection element D1, and charges of "−" are produced on the lower electrode layer thereof. On the other hand, charges of "−" are produced on the upper electrode layer of the detection element D2, and charges of "+" are produced on the lower electrode layer. Accordingly, V1 comes to a positive voltage, and V2 comes to a negative voltage. By carrying out an operation expressed as V1−V2 by using the operation element 71, a sum of absolute values of voltages V1, V2 is determined. The sum thus obtained is outputted to the terminal Tx as a detection value of force Fx. Similarly, in the case where force Fy is exerted, charges of "−" are produced on the upper electrode layer of the detection element D3 and charges of "+" are produced on the lower electrode layer thereof. On the other hand, charges of "+" are produced on the upper electrode layer of the detection element D4 and charges of "−" are produced on the lower electrode layer thereof. Accordingly, V3 comes to a negative voltage and V4 comes to a positive voltage. By carrying out an operation expressed as V4−V3 by using the operation element 72, a sum of absolute values of voltages V3, V4 is determined. The sum thus obtained is outputted to the terminal Ty as a detection value of Fy. Further, in the case where force Fz is exerted, charges of "−" and charges of "+" are respectively produced on the upper electrode layers of the detection elements D5, D6 and on the lower electrode layers thereof. On the other hand, charges of "+" and charges of "−" are respectively produced on the upper electrode layers of the detection elements D7, D8 and on the lower electrode layers thereof. Accordingly, V5, V6 come to a negative voltage, and V7, V8 come to a positive voltage. By carrying out an operation expressed as V7+V8−V5−V6 by using the operation element 73, a sum of absolute values of voltages V5 to V8 is determined. The sum thus obtained is outputted to the terminal Tz as a detection value of Fz.

It should be noted that detection values obtained at the respective output terminals Tx, Ty, Tz do not include other axes components. For example, as indicated by the table of FIG. 11, in the case where only force Fx is exerted, no charge is produced at the detection elements D3, D4 which are used for detecting force Fy. As a result, no detection voltage is obtained at the terminal Ty. At this time, charges (opposite polarity) are respectively produced at the detection elements D5, D6 which are used for detecting force Fz. However, since voltages V5 and V6 are added to each other at the operation element 73, they are canceled. Also in this case, no detection voltage is obtained at the terminal Tz. In the case where only force Fy is exerted, no detection voltage is similarly obtained except for the terminal Ty. In addition, in the case where only force Fz is exerted, no detection voltage is similarly obtained except for the terminal Tz. Thus, components in three axes directions of XYZ can be independently detected.

Figure 13:
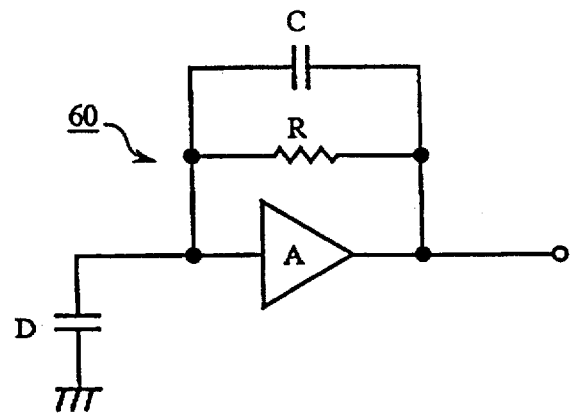
FIG. 13 is a circuit diagram showing an example of a Q/V converting circuit in the circuit diagram of FIG. 12.
Figure 14:
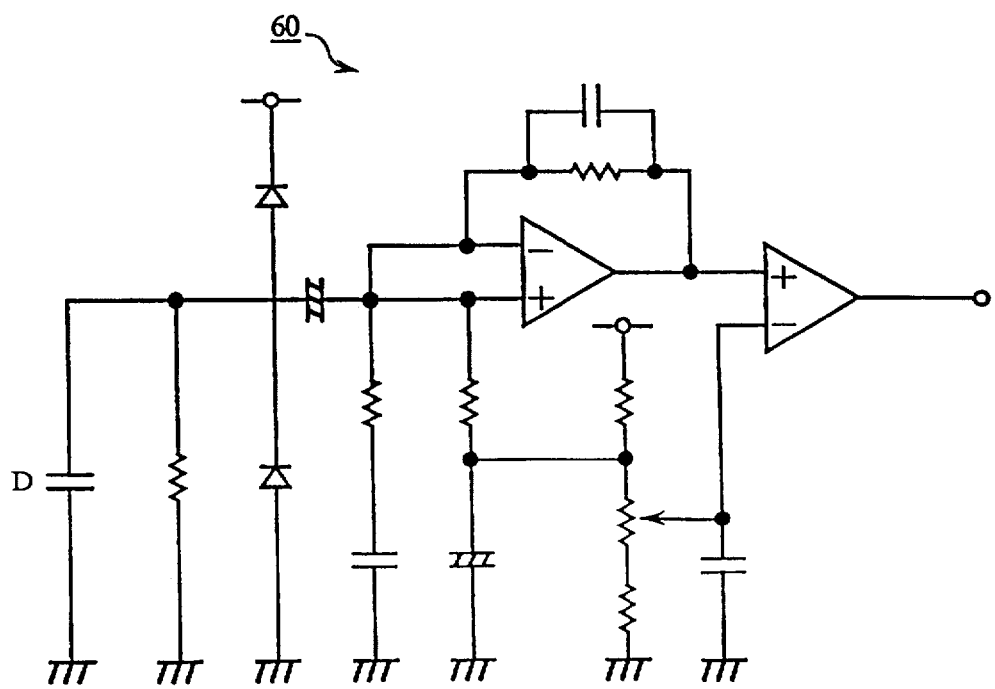
FIG. 14 is a circuit diagram showing another example of the circuit configuration of the Q/V converting circuit in the circuit diagram of FIG. 12.

A Q/V converting circuit 60 shown in FIG. 13 is an example of the fundamental configuration of a circuit suitable for utilization as Q/V converting circuits 61 to 68 in the detecting circuit shown in FIG. 12. Element designated at D in FIG. 13 corresponds to the detection elements D1 to D8. As stated above, fundamentally, it is possible to convert charges produced at a detection element D to a voltage by a simple circuit configuration comprised of operational amplifier A, resistor R and capacitor C. FIG. 14 shows another Q/V converting circuit. In this circuit, two stages of operational amplifiers connected in series are used. It is to be noted that the circuit shown here is presented only for illustrative purpose, and conversion to voltage may be made of course by using any circuit. Such Q/V converting circuit is exemplified, for example, on p.p. 94 to 101 of "Piezoelectric Ceramics New Technology" (Japanese Book: edited by the Japanese Electronics Material Industrial Associate, and published by Ohm Co., Ltd.).

§4. Another Embodiment Of Sensor According To This Invention

Figure 15:
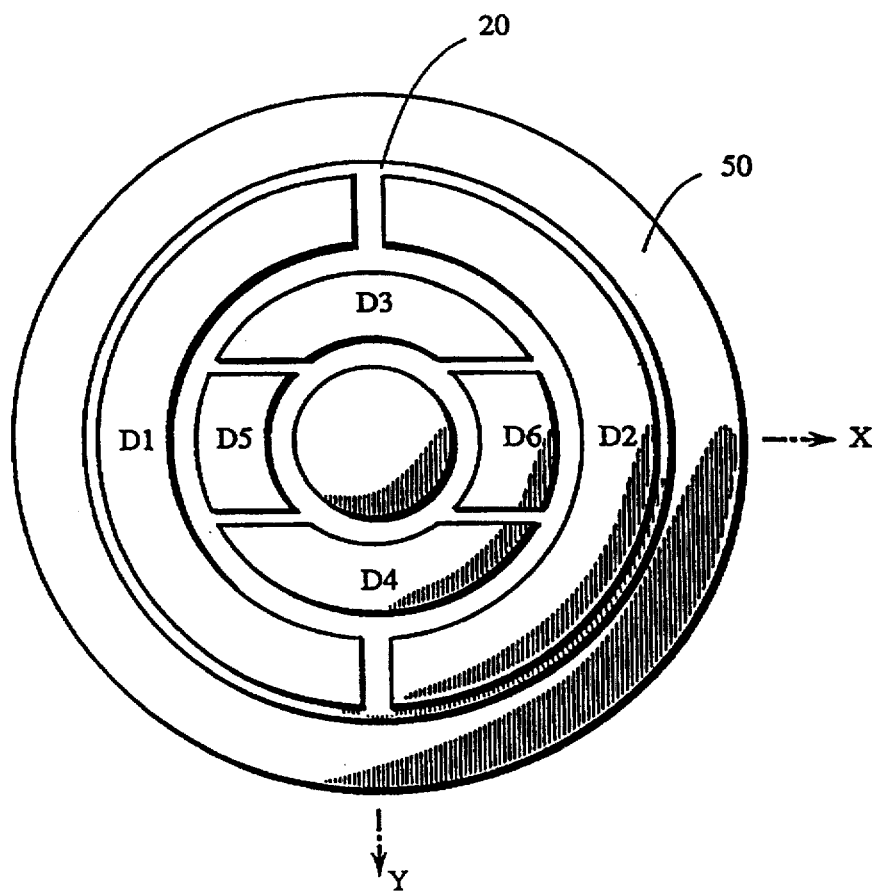
FIG. 15 is a top view of a three-dimensional force sensor according to another embodiment of this invention.
Figure 16:
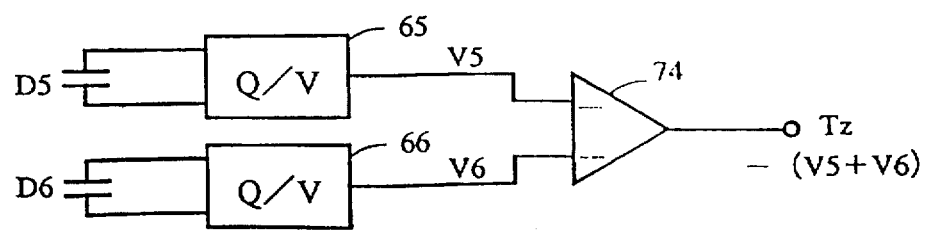
FIG. 16 is a circuit diagram showing a detecting circuit for detecting force Fz in the Z-axis direction with respect to the sensor of FIG. 15.

Subsequently, various force sensors according to other embodiments of this invention will be disclosed. As seen from the table shown in FIG. 11, in fact, it is not necessarily required to prepare four detection elements for detection of force Fz. For example, even if only two detection elements D5, D6 are used, it is possible to detect force Fz. Further, even if only two detection elements D7, D8 are used, it is possible to detect force Fz. In short, in accordance with this invention, it is sufficient that, for detecting a force exerted in one axis direction, at least two detection elements are prepared. The embodiment of which top view is shown in FIG. 15 is directed to a sensor using only six detection elements D1 to D6. Since detection elements D7, D8 are not provided, the areas of the detection elements D1, D2 are increased accordingly. When a circuit as shown in FIG. 16 is used to carry out an operation expressed as −(V5+V6) by using operation element 74, a detection value of force Fz is outputted to terminal Tz.

Figure 17:
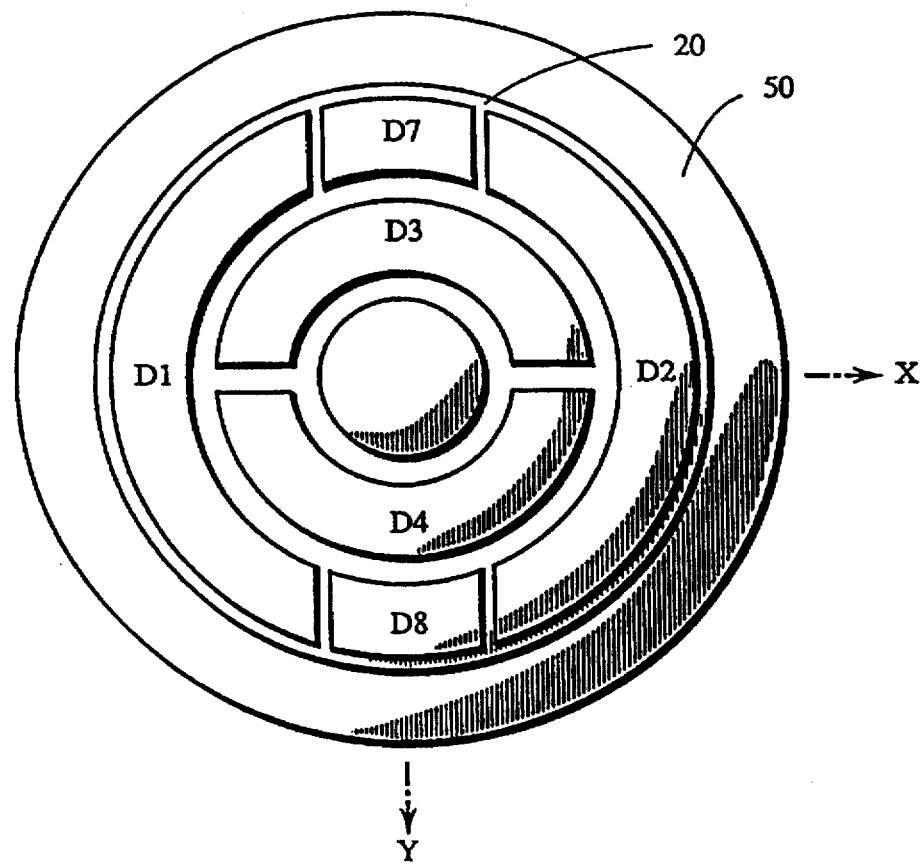
FIG. 17 is a top view of a three-dimensional force sensor according to a further embodiment of this invention.
Figure 18:
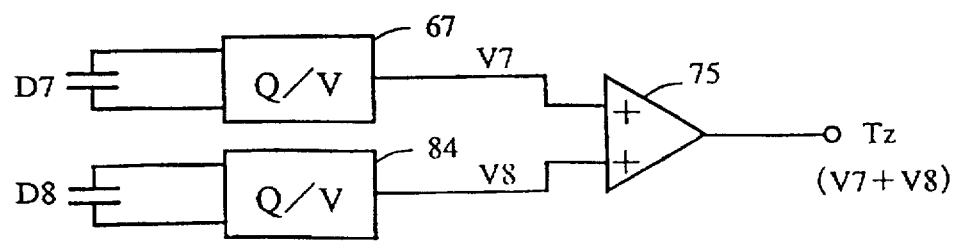
FIG. 18 is a circuit diagram showing a detecting circuit for detecting force Fz in the Z-axis direction with respect to the sensor of FIG. 17.

The embodiment of which top view is shown in FIG. 17 is directed to a sensor using only six detection elements D1 to D4, D7, D8. Since detection elements D5, D6 are not provided, the areas of the detection elements D3, D4 are increased accordingly. When a circuit as shown in FIG. 18 is used to carry out an operation expressed as (V7+V8) by using operation element 75, a detection value of force Fz is outputted to terminal Tz.

In addition to the above, two detection elements for detecting force Fz may be arranged on any axis. In short, when a fourth axis W passing through the origin O on the XY-plane is defined and a pair of detection elements are respectively arranged on the positive and negative sides of the fourth axis W, force Fz can be detected by these detection elements. FIG. 15 is the example where the fourth axis W is caused to be in correspondence with the X-axis, and FIG. 17 is the example where the fourth axis W is caused to be in correspondence with the Y- axis.

Figure 19:
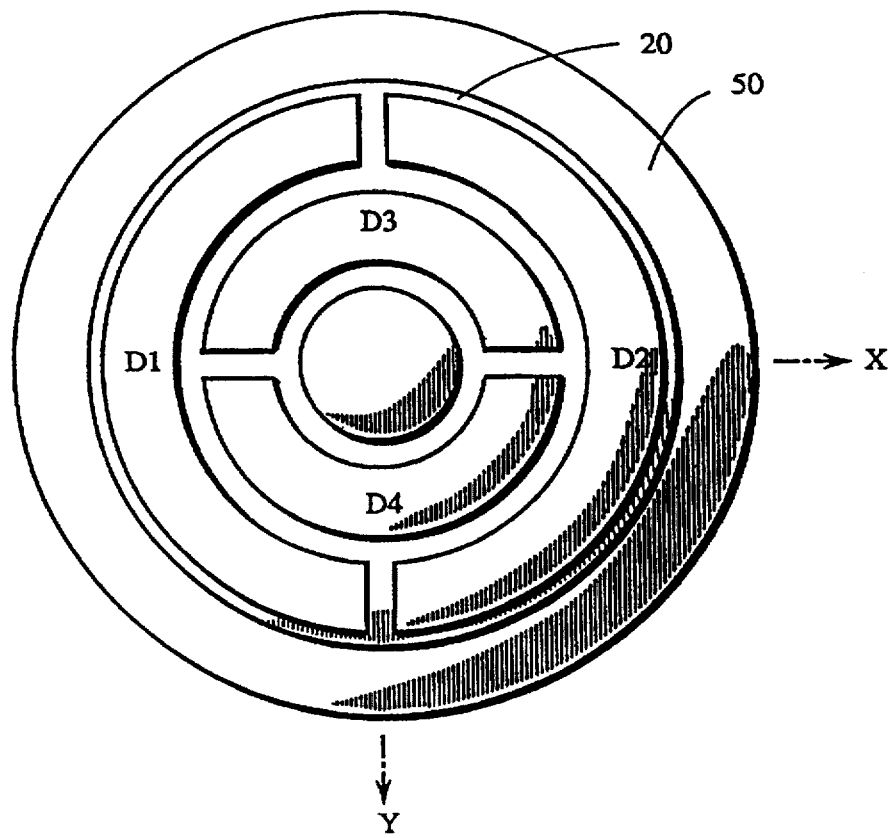
FIG. 19 is a top view of a two-dimensional force sensor according to an embodiment of this invention.

While the embodiments of three-dimensional force sensors for detecting components in respective axes directions of force with respect to three axes of XYZ have been described above, in the case of two-dimensional force sensors for detecting components in respective axes directions of force with respect to two axes of XY, it is sufficient that only four detection elements are used. The embodiment of which top view is shown in FIG. 19 is directed to a two-dimensional force sensor using only four detection elements D1 to D4. Since any detection element for detecting force Fz is not provided, the areas of the detection elements D1 to D4 are increased accordingly.

While, in the above-described embodiments, the single piezoelectric element 20 is used as a piezoelectric element which is common to all detection elements, it may be constituted with a plurality of piezoelectric elements. For example, several independent piezoelectric elements may be used every respective detection elements, or several independent piezoelectric elements may be used every plural sets of detection elements.

§5. Embodiment For Implementing Different Polarization Processing To Piezoelectric Element As described above, with the sensors of this invention, it is possible to detect components in respective axes directions of an applied force on the basis of charges produced on the upper and lower electrode layers of respective detection elements. For this reason, it is necessary to implement a predetermined wiring to respective electrode layers. Wirings for the upper electrode layers and wirings for the lower electrode layers are mixed. Accordingly, in the case where such sensors are mass-produced, the cost for wiring cannot be disregarded as compared to the total cost of products. The embodiment which will be described below is adapted to partially vary the polarization characteristic of the piezoelectric element to thereby simplify wiring to reduce-the manufacturing cost.

Figure 20A:
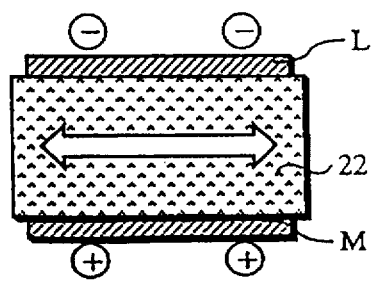
FIGS. 20a and 20b are views showing the polarization characteristic (type II) of the piezoelectric element 22 utilized in this invention.
Figure 20B:
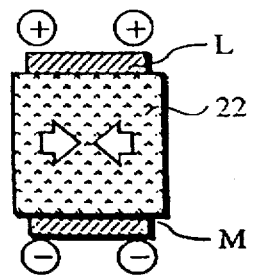

In piezoelectric ceramic materials etc., elements having an arbitrary polarization characteristic can be manufactured. For example, the piezoelectric element 20 used in the above-described sensors had a polarization characteristic of the type I as shown in FIG. 4. On the contrary, it is also possible to manufacture piezoelectric element 22 having a polarization characteristic of the type II as shown in FIGS. 20a and 20b. Namely, it is possible to manufacture piezoelectric element 22 having a polarization characteristic such that in the case where a force in a direction to expand along the XY-plane is exerted as shown in FIG. 20a, negative charges and positive charges are respectively produced on the upper electrode layer L and on the lower electrode layer M, while in the case where a force in a direction to contract along the XY-plane is exerted as shown in FIG. 20b, positive charges and negative charges are respectively produced on the upper electrode layer L and the lower electrode layer M. In addition, a single piezoelectric element is permitted to have the polarization characteristic of the type I at a portion and to have the polarization characteristic of the type II at another portion. The embodiment which will be described below uses a piezoelectric element to which such a localized polarization processing is implemented to thereby simplify the structure of the sensor.

Figures 21, 22:
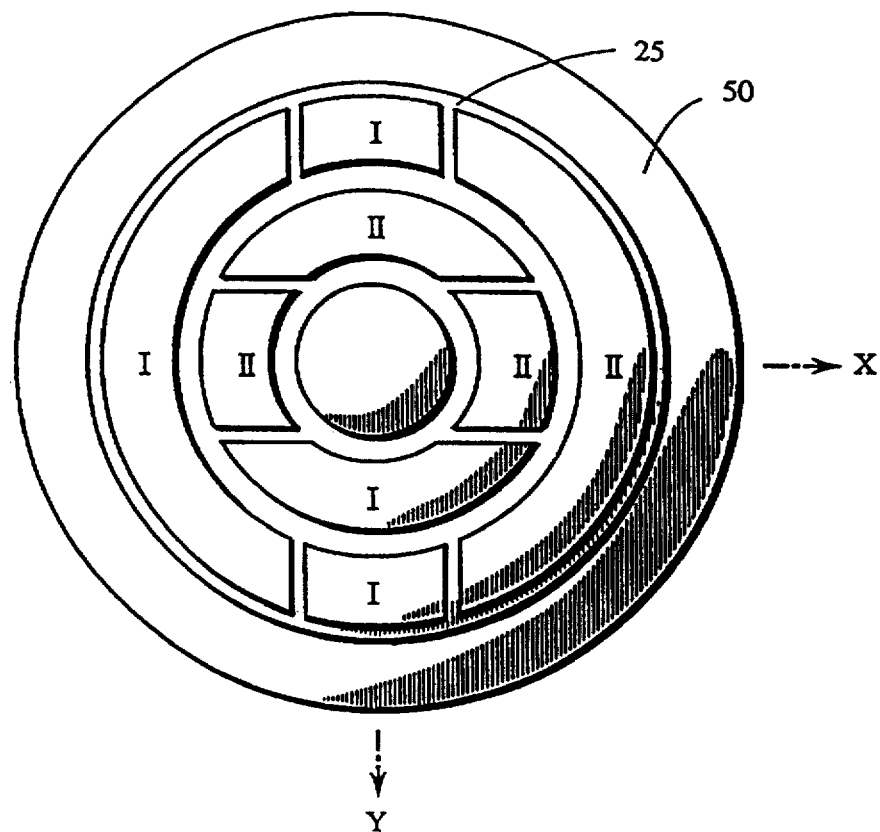
FIG. 21 is a top view of a force sensor according to an embodiment of this invention utilizing a piezoelectric element 25 having partially different polarization characteristics.
FIG. 22 is a table showing polarities of charges produced on the upper electrode of respective detection elements D1 to D8 when force components Fx, Fy, Fz in respective axes directions are applied to the sensor of FIG. 21.

A sensor of which top view is shown in FIG. 21 is a sensor using piezoelectric element 25 to which such a localized polarization processing is implemented. This piezoelectric element 25 is an element which has exactly the same doughnut disk-shaped as that of piezoelectric element 20 used in the sensor of FIG. 7 mentioned above. However, its polarization characteristic is different from that of piezoelectric element 20. The piezoelectric element 20 was an element in which all portions have the same polarization characteristic of the type I. On the contrary, piezoelectric element 25 has polarization characteristic of either the type I or the type II in respective eight regions as shown in FIG. 21. Namely, this piezoelectric element 25 indicates the polarization characteristic of the type I in the regions of detection elements D1, D4, D7, D8, and indicates the polarization characteristic of the type II in the regions of detection elements D2, D3, D5, D6 (see FIGS. 7 and 21).

Figure 23:
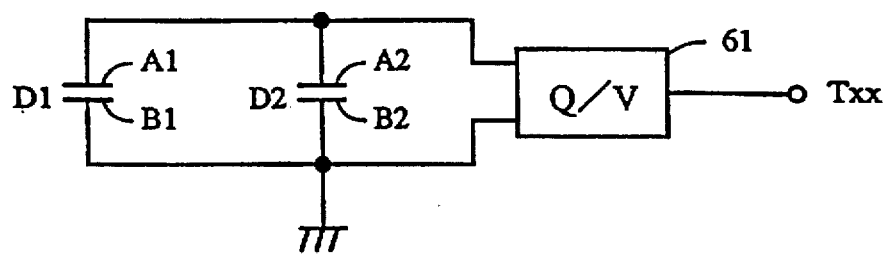
FIG. 23 is a circuit diagram showing an example of a detecting circuit used in the sensor of FIG. 21.
Figure 23:
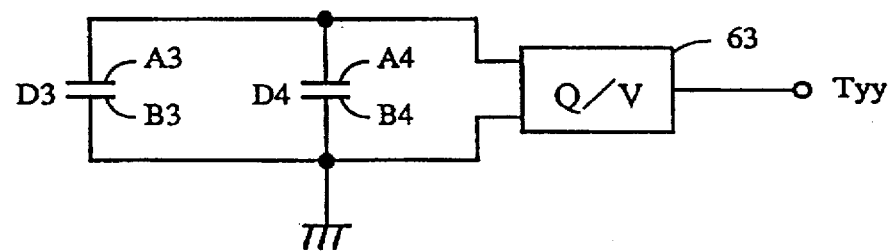
Figure 23:
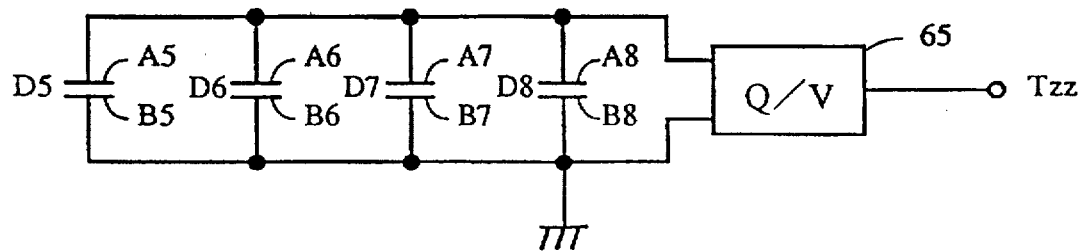

As stated above, the sensor shown in FIG. 21 is a sensor using piezoelectric element 25 to which a localized polarization processing is implemented. Now it will be considered how polarities of charges produced on respective electrode layers vary in this sensor. It is seen that polarities of charges produced on the upper electrode layers and the lower electrode layers formed in the region having polarization characteristic of the type II are opposite to those of the previously described sensor. Namely, polarities relating to the detection elements D2, D3, D5, D6 shown in the table of FIG. 11 are inverted. Thus, result as shown in the table of FIG. 22 is obtained (bars indicated above the name of each detection element indicates that the polarization characteristic of that detection element is inverted). Attention should be drawn to the portions encompassed by thick line in the table of FIG. 22. These portions are portions which participate in detection of force Fx, detection of force Fy, and detection of force Fz, and polarities of charges produced on the upper electrode side are all "+". For this reason, if a wiring as shown in FIG. 23 is implemented to respective detection elements, detection values of force components Fx, Fy, Fz can be respectively obtained at terminals Txx, Tyy, Tzz as they are. In other words, any operation element as shown in FIG. 12 becomes unnecessary.

The important point in the wiring shown in FIG. 23 resides in that lower electrode layers B1 to B8 are all connected commonly to the ground potential (earth). Since lower electrode layers of all detection elements are caused to conduct each other, wiring becomes very simple. If lower electrode layers B1 to B8 are permitted to be conductive in this way, there is no necessity of intentionally allowing these eight electrode layers to be respectively independent electrode layers. Namely, as shown in the side cross sectional view of FIG. 24, it is sufficient to provide only one common lower electrode layer B0. The common lower electrode layer B0 is a single doughnut shaped (like a washer) electrode layer, and serves as an electrode opposite to all eight upper electrode layers A1 to A8.

Figure 24:
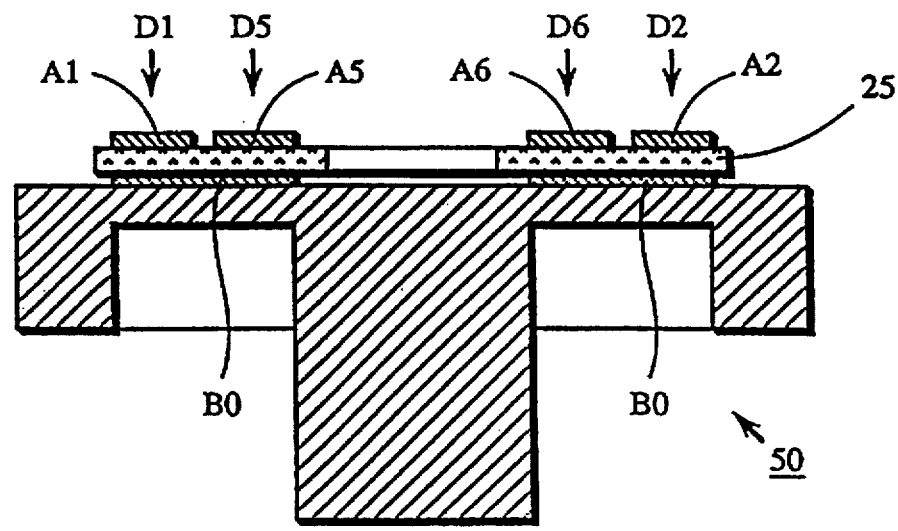
FIG. 24 is a side cross sectional view showing the embodiment in which lower electrode layers in the sensor of FIG. 21 are constructed as a single common electrode layer (only the cross sectional portion is depicted with respect to each electrode layer).
Figure 25:
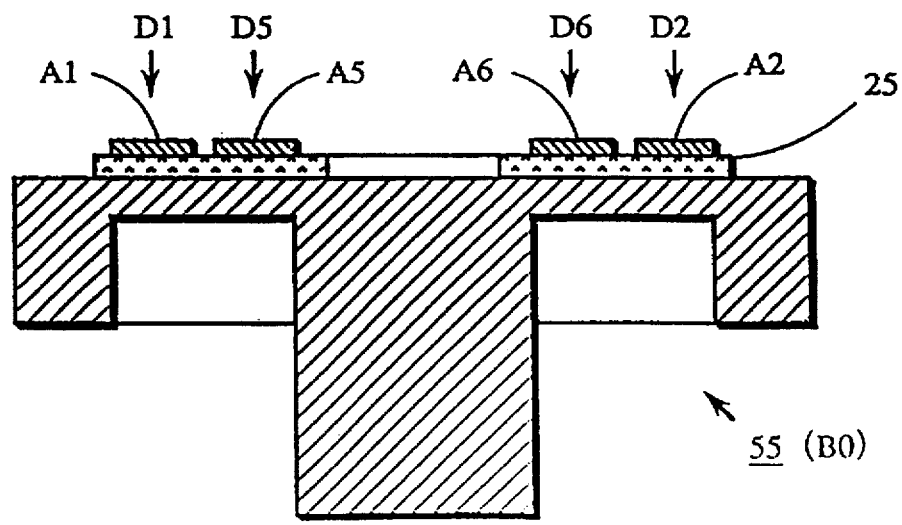
FIG. 25 is a side cross sectional view showing the embodiment in which the lower electrode layer in the sensor of FIG. 21 is constituted with a conductive strain generative body 55 itself (only the cross sectional portion is depicted with respect to each electrode layer).

In order to further simplify the structure shown in FIG. 24, it is sufficient to use conductive strain generative body 55 (strain generative body comprised of, e.g., metal material). If this is implemented, the structure in which the lower surface of piezoelectric element 25 is directly connected to the upper surface of the strain generative body 55 can be realized without using special lower electrode layer B0 as shown in the side cross sectional view of FIG. 25. In this case, the strain generative body 55 itself functions as a common lower electrode layer B0. While the lower electrode layers are caused to be a common single electrode layer in the above-described embodiment, the upper electrode layers may be a common single electrode layer in a manner opposite to the above.

Figure 26A:
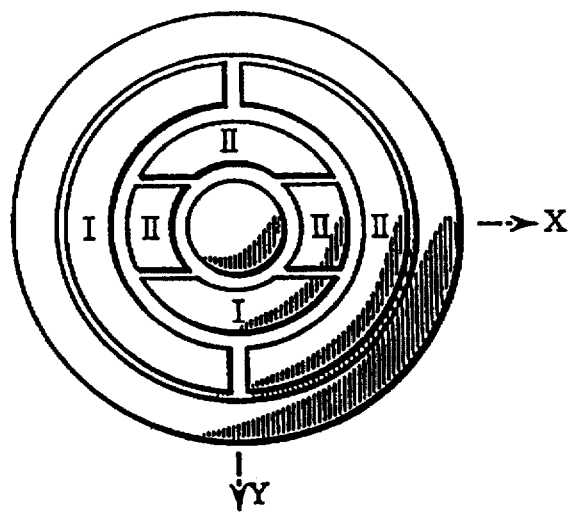
FIGS. 26a, 26b and 26c are views showing types of the polarization characteristics in the case where different polarization characteristics are applied to the piezoelectric element of the force sensor shown in FIGS. 15, 17 and 19, respectively.
Figure 26B:
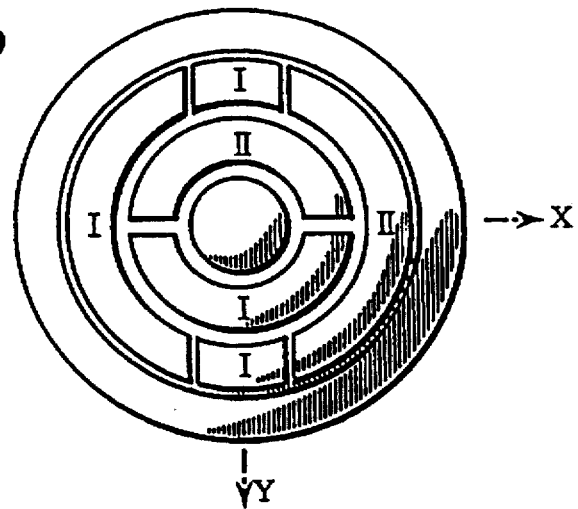
Figure 26C:
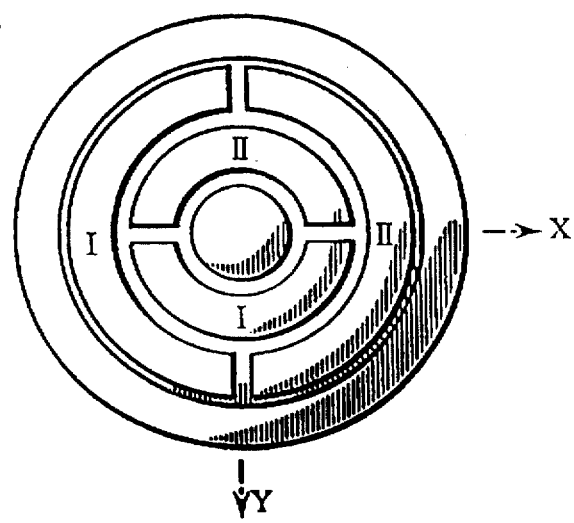

By implementing a different polarization processing to the piezoelectric element as stated above, it becomes possible to simplify wiring for electrodes. It is to be noted that if a polarization processing as shown in FIG. 26a is implemented to the sensor of the embodiment shown in FIG. 15, a polarization processing as shown in FIG. 26b is implemented to the sensor of the embodiment shown in FIG. 17, and a polarization processing as shown in FIG. 26c is implemented to the sensor of the embodiment shown in FIG. 19, wiring can be similarly simplified.

§6. Application To Acceleration Sensor/Magnetic Sensor

Figure 27:
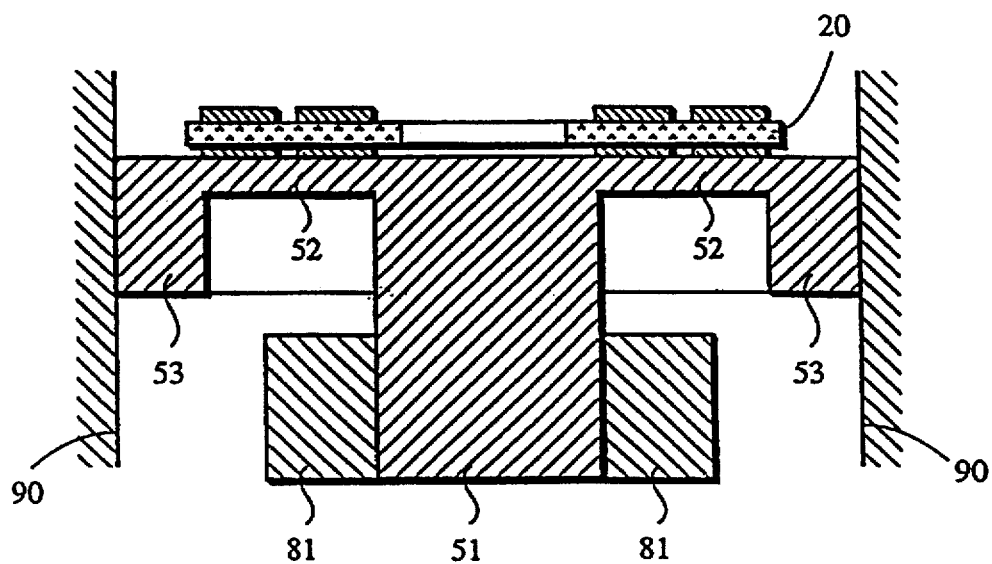
FIG. 27 is a side cross sectional view showing an embodiment of an acceleration sensor according to this invention (only the cross sectional portion is depicted with respect to each electrode layer).

While the sensor according to this invention has been described as a force sensor, this sensor can be also applied to an acceleration sensor or a magnetic sensor. For example, as shown in FIG. 27, if fixed portion 53 of the sensor shown in FIGS. 7 and 8 is fixed to sensor casing 90 and annular weight body 81 is attached to the periphery of the working portion 51, detection of acceleration can be made. That is, if the sensor casing 90 is attached to an automotive vehicle, etc., a force is exerted on the weight body 81 in dependency upon acceleration which the automotive vehicle undergoes, and this force is transmitted to the flexible portion 52 through the working portion 51. Thus, acceleration components αx, αy, αz in three axes directions can be detected in place of force components Fx, Fy, Fz in three axes directions.

Further, if the weight body 81 is constituted with magnetic material (iron, cobalt, nickel, etc.), this sensor can be utilized as a magnetic sensor. Namely, when this sensor is placed in magnetic field, the weight body 81 comprised of magnetic material undergoes action of magnetic force. As a result, a force is exerted on the working portion 51. Accordingly, magnetism can be detected as a magnetic force that the working portion 51 has undergone.

Figure 28:
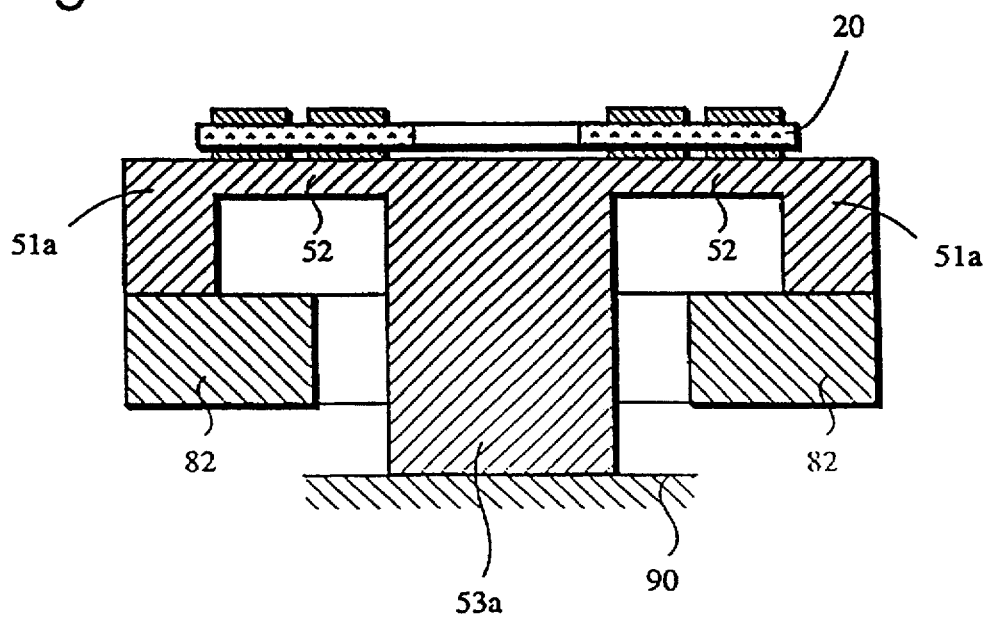
FIG. 28 is a side cross sectional view showing another embodiment of an acceleration sensor according to this invention (only the cross sectional portion is depicted with respect to each electrode layer).

It is to be noted that while, in all the above-described embodiments, the fixed portion 53 positioned around the strain generative body 50 is fixed to the sensor casing so that an external force is exerted on the working portion 51 positioned in the center, the central portion may be fixed to the sensor casing so that an external force is exerted on the peripheral portion in a manner entirely opposite to the above. FIG. 28 shows an example of an acceleration sensor based on such an idea. In this sensor, there is employed a structure such that the portion corresponding to the working portion 51 in the sensor of FIG. 27 is fixed to the sensor casing 90 as fixed portion 53a, and the portion corresponding to the fixed portion 53 is caused to freely undergo displacement as working portion 51a. In addition, annular weight body 82 is attached to the working portion 51a. Since the weight body 82 in the sensor shown in FIG. 28 has larger volume in structure as compared to the weight body 81 in the sensor shown in FIG. 27, mass is permitted to be larger as a weight body. Thus, sensitivity as the acceleration sensor can be more improved.

§7. Addition Of Self-diagnostic Function

Figure 29:
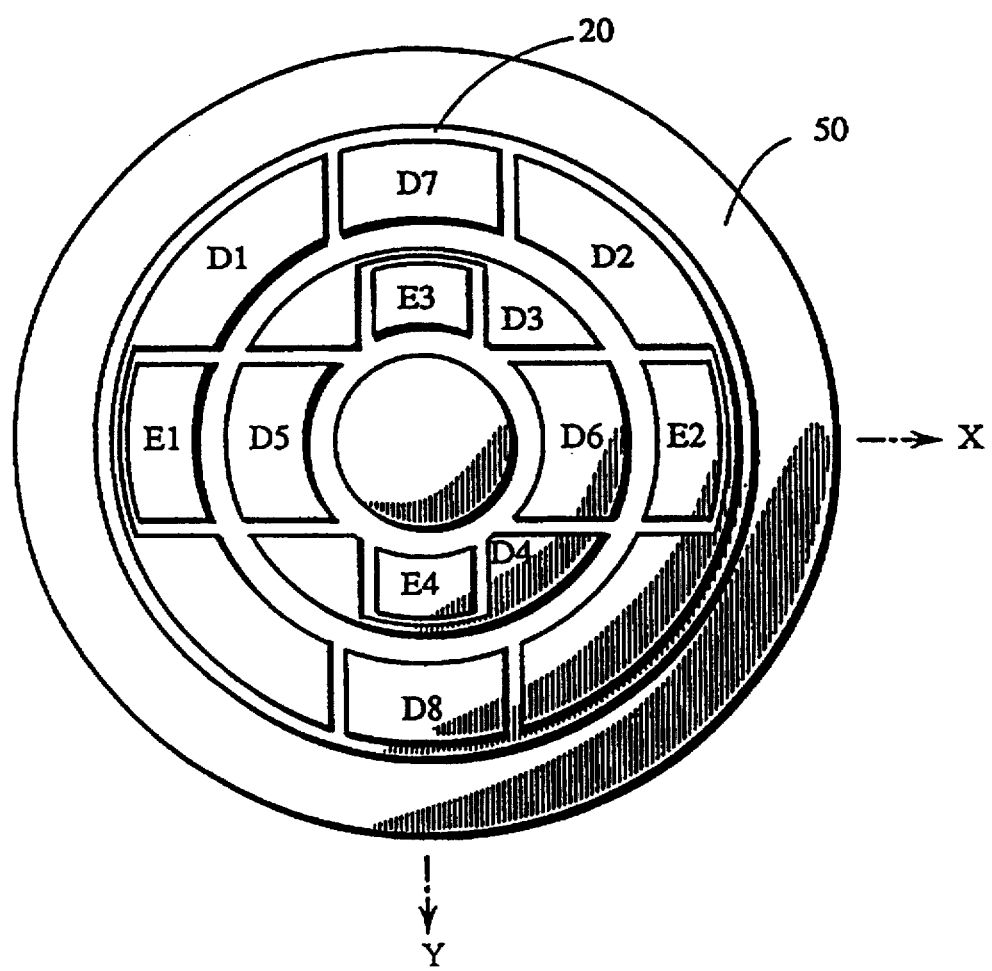
FIG. 29 is a top view showing a sensor having self-diagnostic function according to this invention.

A force sensor shown in FIG. 29 is a sensor in which a self-diagnostic function is further added to the force sensor shown in FIG. 7. This sensor differs from the force sensor shown in FIG. 7 in that four expanding/contracting elements E1 to E4 are provided in addition to detection elements D1 to D8. For the purpose of providing these expanding/contracting elements E1 to E4, detection elements D1 to D4 are in forms partially lacking. Expanding/contracting elements E1 to E4 newly provided are exactly the same as detection elements D1 to D8 in structure. Namely, they have a structure in which a portion of piezoelectric element 20 is sandwiched between an upper electrode layer and a lower electrode layer. It is to be noted that detection elements D1 to D8 are used for detecting partial expansion/contraction of piezoelectric element 20 as charges produced on both the upper and lower electrodes, whereas expanding/contracting elements E1 to E4 are used for allowing piezoelectric element 20 to undergo partial expansion/contraction by applying a predetermined voltage across both the upper and lower electrodes. As stated above, a detection element and an expanding/contracting element are different only in use, but both the elements are exactly the same in structure.

For example, if a voltage is applied so that the upper electrode and the lower electrode of the dexpanding/contracting element E1 respectively indicate "+" and "−", this portion of piezoelectric element 20 expands in a lateral direction as shown in FIG. 4a. At this time, if a voltage is applied at the same time so that the upper electrode and the lower electrode of the expanding/contracting element E2 respectively indicate "−" and "+", this portion of piezoelectric element 20 contracts in a lateral direction as shown in FIG. 4b. When such expansion/contraction takes place, strain generative body 50 produces bending similar to the displacement state just shown in FIG. 5. This is equivalent to the state where external force Fx is exerted. Namely, there results the state where a displacement equivalent to the case where external force Fx is exerted is induced by applying a predetermined voltage to a predetermined expanding/contracting element although external force Fx is not exerted in fact. Accordingly, if, in this state, an approach is employed to examine detection outputs by the detection elements D1, D2 to examine whether or not an output equivalent to that when external force Fx is exerted is obtained, it is possible to carry out self-diagnosis with respect to the detection system of Fx in the X-axis direction.

Similarly, by applying a predetermined voltage to the expanding/contracting elements E3, E4, it is possible to induce a displacement equivalent to the state where external force Fy is exerted. Accordingly, when, in this state, an approach is employed to examine detection outputs by the detection elements D3, D4 to examine as to whether or not an output equivalent to the state where external force Fy is exerted is obtained, it is possible to carry out self-diagnosis with respect to the detection system of force Fy in the Y-axis direction.

Further, by applying predetermined voltages to the expanding/contracting elements E1 to E4, it is also possible to induce a displacement equivalent to the state where external force Fz is exerted. Namely, if voltages are applied so that the upper electrodes of the expanding/contracting elements E1, E2, E3, E4 respectively indicate "+" "+" "−" "−" and the lower electrodes thereof respectively indicate polarities opposite to the above, a bending similar to the displacement state just shown in FIG. 6 takes place, resulting in the displacement state equivalent to the state where external force Fz is exerted. Accordingly, when, in this state, an approach is employed to examine detection outputs by the detection elements D5 to D8 to examine whether or not an output equivalent to the state where external force Fz is exerted is obtained, it is possible to carry out self-diagnosis with respect to the detection system of force Fz in the Z-axis direction.

§8. Application To Angular Velocity Sensor

Figure 30:
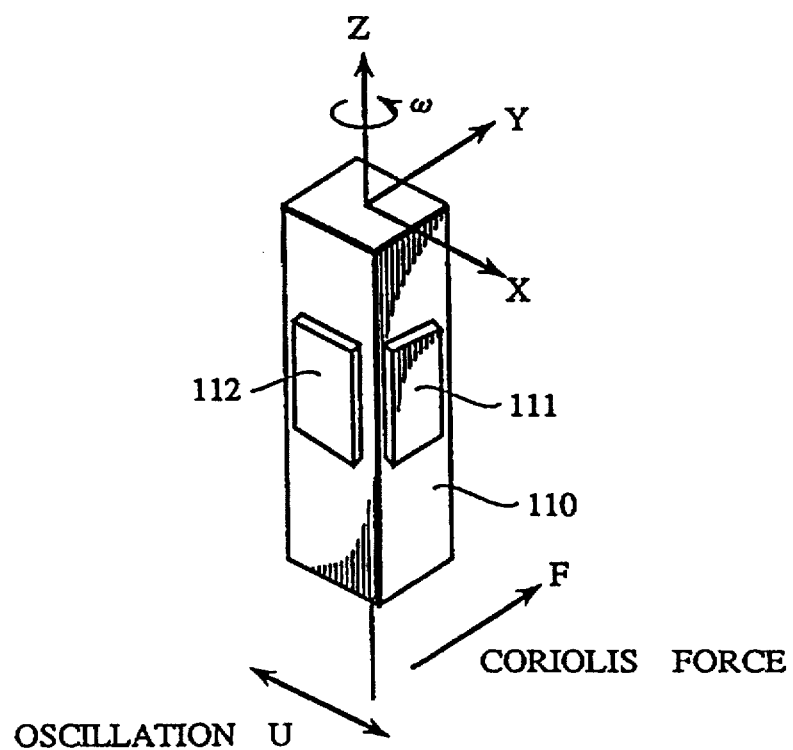
FIG. 30 is a perspective view showing the fundamental principle of a conventionally proposed one-dimensional angular velocity sensor utilizing Coriolis force.

While the above-described sensors according to this invention can detect force, acceleration or magnetism, they can be applied to angular velocity sensors in addition to the above. A method for application to a multi-axial angular velocity sensor capable of detecting angular velocity components about plural axes will now be described. Initially, the principle of detection of angular velocity by a uni-axial angular velocity sensor which provides basis of the multi-axial angular velocity sensor will be briefly described. FIG. 30 is a view showing the fundamental principle of an angular velocity sensor disclosed on p. 60 of the Japanese Magazine "THE INVENTION", vol. 90, No. 3 (1993). Now, a pillar-shaped oscillator (or vibrator) 110 is prepared and consideration will be made in connection with an XYZ three-dimensional coordinate system in which X, Y, Z axes are defined in directions as shown. It is known that in the case where the oscillator 110 is rotating at angular velocity $\omega$ with the Z-axis which is an axis of rotation in such system, phenomenon as described below takes place. Namely, when the oscillator 110 is caused to undergo an oscillation U such that it is reciprocated in the X-axis direction, a Coriolis force F is produced in the Y-axis direction. In other words, when the oscillator 110 is rotated with the Z-axis being as a rotational axis in the state where the oscillator 110 is oscillated along the X-axis of the figure, Coriolis force F will be produced in the Y-axis direction. This phenomenon is dynamic phenomenon known from the old as Foucault pendulum. A Coriolis force F produced is expressed as follows:

$$F = 2m \cdot v \cdot \omega$$

In the above formula, m is a mass of the oscillator 110, v is an instantaneous velocity with respect to an oscillation of the oscillator 110, and $\omega$ is an instantaneous angular velocity of the oscillator 110.

The uni-axial angular velocity sensor disclosed in the previously described magazine detects angular velocity $\omega$ by making use of this phenomenon. Namely, as shown in FIG. 30, a first piezoelectric element 111 is attached to a first surface of the pillar-shaped oscillator 110, and a second piezoelectric element 112 is attached to a second surface perpendicular to the first surface. As piezoelectric elements 111, 112, a plate shaped element comprised of piezoelectric ceramic material is used. For the purpose of allowing the oscillator 110 to undergo oscillation U, the piezoelectric element 111 is utilized. For detecting Coriolis force F produced, the piezoelectric element 112 is utilized. Namely, when an a.c. voltage is delivered to the piezoelectric element 111, the piezoelectric element 111 repeats reciprocating movement so that it oscillates in the X-axis direction. This oscillation U is transmitted to the oscillator 110. As a result, the oscillator 110 oscillates in the X-axis direction. When the oscillator 110 itself rotates at angular velocity $\omega$ with the Z-axis being as the axis of rotation in the state where the oscillator 110 is caused to undergo oscillation U as stated above, Coriolis force F is produced in the Y-axis direction by the above-described phenomenon. Since this Coriolis force F is exerted in a thickness direction of the piezoelectric element 112, a voltage V proportional to Coriolis force F is produced on both the surfaces of the piezoelectric element 112. Accordingly, by measuring this voltage V, it becomes possible to detect angular velocity $\omega$.

Figure 31:
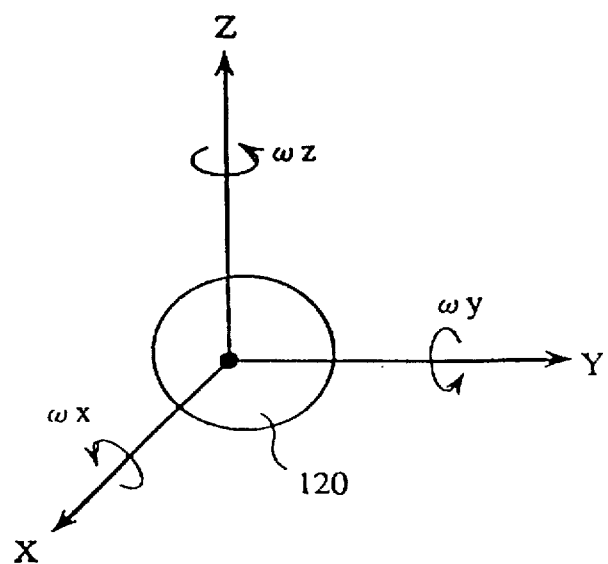
FIG. 31 is a view showing angular velocity components about respective axes in the XYZ three-dimensional coordinate system to be detected in the angular velocity sensor.
Figure 32:
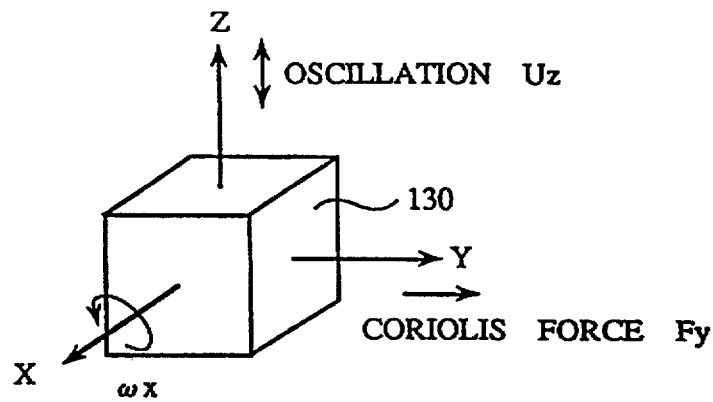
FIG. 32 is a view for explaining the fundamental principle to detect angular velocity ωx about the X-axis by using the sensor according to this invention.
Figure 33:
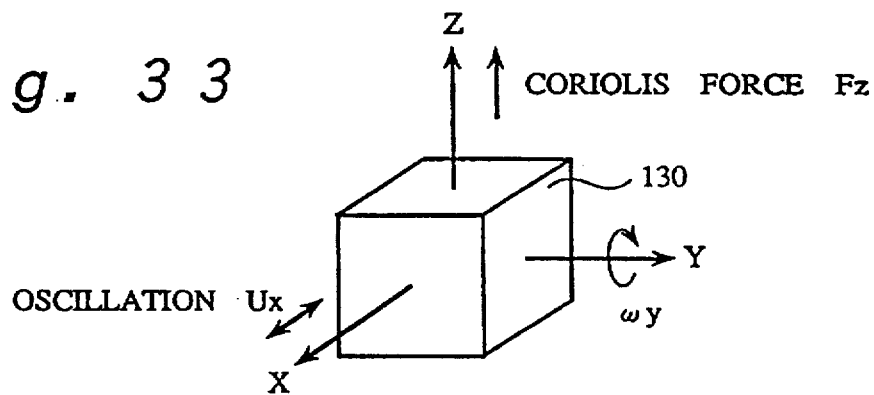
FIG. 33 is a view for explaining the fundamental principle to detect angular velocity ωy about the Y-axis by using the sensor according to this invention.
Figure 34:
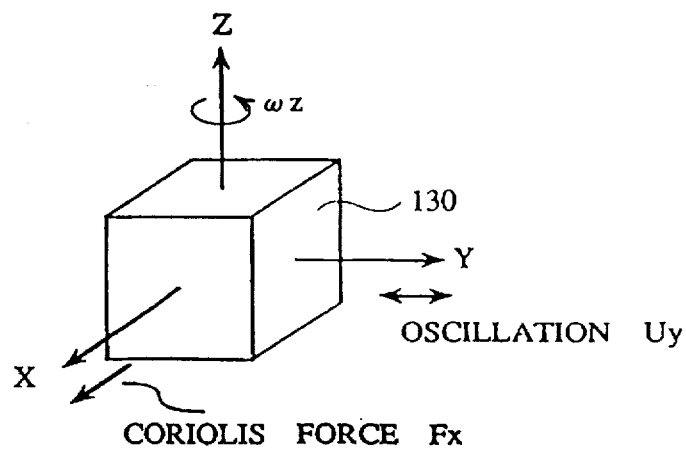
FIG. 34 is a view for explaining the fundamental principle to detect angular velocity ωz about the Z-axis by using the sensor according to this invention.

The above-described conventional angular velocity sensor is adapted for detecting an angular velocity about the Z-axis. Accordingly, it is unable to carry out detection of angular velocity about the X-axis or the Y-axis. However, when a three-dimensional sensor according to this invention is applied, a multi-axial velocity sensor capable of respectively independently detecting angular velocity $\omega x$ about the X-axis, angular velocity $\omega y$ about the Y-axis, and angular velocity $\omega z$ about the Z-axis in the XYZ three-dimensional coordinate system with respect to a predetermined object 120 can be realized as shown in FIG. 31. The fundamental principle will now be described with reference to FIGS. 32 to 34. It is now assumed that oscillator 130 is placed at the position of the origin of the XYZ three-dimensional coordinate system. In order to detect angular velocity $\omega x$ about the X-axis of the oscillator 130, it is sufficient to measure a Coriolis force Fy produced in the Y-axis direction when the oscillator 130 is caused to undergo oscillation Uz in the Z-axis direction as shown in FIG. 32. The Coriolis force Fy takes a value proportional to angular velocity $\omega x$. Further, in order to detect angular velocity $\omega y$ about the Y-axis of the oscillator 130, it is sufficient to measure Coriolis force Fz produced in the Z-axis direction when the oscillator 130 is caused to undergo oscillation Ux in the X-axis direction as shown in FIG. 33. The Coriolis force Fz takes a value proportional to angular velocity $\omega y$. In addition, in order to detect angular velocity $\omega z$ about the Z-axis of the oscillator 130, it is sufficient to measure Coriolis force Fx produced in the X-axis direction when the oscillator 130 is caused to undergo oscillation Uy in the Y-axis direction as shown in FIG. 34. The Coriolis force Fx takes a value proportional to angular velocity $\omega z$.

Eventually, in order to detect angular velocity components every respective axes in the XYZ three-dimensional coordinate system, the mechanism for allowing the oscillator 130 to undergo oscillation in the X-axis direction, the mechanism for allowing it to undergo oscillation in the Y-axis direction and the mechanism for allowing it to undergo oscillation in the Z-axis direction, the mechanism for detecting Coriolis force Fx in the X-axis direction exerted on the oscillator 130, the mechanism for detecting Coriolis force Fy in the Y-axis direction exerted thereon and the mechanism for detecting Coriolis force Fz in the Z-axis direction exerted thereon are required.

Let now consider the sensor having self-diagnostic function shown in FIG. 29. As previously described, by applying predetermined voltages to the expanding/contracting elements E1 to E4, this sensor can make up, in pseudo manner, a displacement state equivalent to the state where force Fx in the X-axis direction is applied to the working portion 51, a displacement state equivalent to the state where force Fy in the Y-axis direction is applied, and a displacement state equivalent to the state where force Fz in the Z-axis direction is applied. It is a matter of course that if polarities of applied voltages are inverted, it is also possible to make up, in pseudo manner, a displacement state equivalent to the state where force -Fx in the -X-axis direction is applied to the working portion 51, a displacement state equivalent to the state where force -Fy in the -Y-axis direction is applied, and a displacement state equivalent to the state where force -Fz in the -Z-axis direction is applied. By making use of this function, it is possible to oscillate the working portion 51 in all directions of X, Y, Z. For example, when a displacement state equivalent to the state where force Fx in the X-axis direction is applied and a displacement state equivalent to the state where force -Fx in the -X-axis direction is applied are made up alternately, the working portion 51 oscillates in the X-axis direction. In a more practical sense, it is sufficient to apply a.c. voltages having phases opposite to each other to the expanding/contracting elements E1 and E2. When voltage of "+" and voltage of "−" are respectively applied to the upper electrode and the lower electrode of the expanding/contracting element E1, and voltage of "−" and voltage of "+" are respectively applied to the upper electrode and the lower electrode of the expanding/contracting element E2, a displacement in the positive direction of the X-axis is produced in the working portion 51 (In FIG. 9, if the detection element D1 is read as the expanding/contracting element E1, and the detection element D2 is read as the expanding/contracting element E2, this displacement state will result). Since an applied voltage is an alternative current, polarities of voltages applied to the respective electrodes described above are inverted at the next half period. As a result, a displacement in a negative direction of the X-axis is produced in the working portion 51. Thus, the working portion 51 reciprocates in the positive and the negative directions of the X-axis so that an oscillation takes place. Similarly, if a predetermined a.c. voltage is applied to a predetermined expanding/contracting element, it is possible to oscillate the working portion 51 in the Y-axis direction, or to oscillate it in the Z-axis direction.

On the other hand, the sensor having the self-diagnostic function shown in FIG. 29 can independently detect force components Fx, Fy, Fz applied to the working portion 51 by using the detection elements D1 to D6. Eventually, this sensor has a function of oscillating the working portion 51 in an arbitrary axis direction of X, Y, Z axes, and has a function of independently detecting force components in X, Y, Z axes directions applied to the working portion 51. If such functions are used in combination, this sensor can be utilized as an angular velocity sensor. This is accomplished by using the principle of detection shown in FIGS. 32 to 34. For example, in order to detect angular velocity ωx about the X-axis, it is sufficient to allow the working portion 51 (corresponding to the oscillator 130) to undergo oscillation Uz in the Z-axis direction as shown in FIG. 32 to measure Coriolis force Fy produced in the Y-axis direction. The Coriolis force Fy takes a value proportional to angular velocity ωx. Further, in order to detect angular velocity ωy about the Y-axis, it is sufficient to allow the working portion 51 to undergo oscillation Ux in the X-axis direction as shown in FIG. 33 to measure Coriolis force Fz produced in the Z-axis direction. The Coriolis force Fz takes a value proportional to angular velocity ωy. In addition, in order to detect angular velocity ωz about the Z-axis, it is sufficient to allow the working portion 51 to undergo oscillation Uy in the Y-axis direction as shown in FIG. 34 to measure Coriolis force Fx produced in the X-axis direction. The Coriolis force Fx takes a value proportional to angular velocity ωz. It is to be noted that it is desirable that a frequency of an oscillation is set to a resonant frequency which can take a large amplitude. While, in the above-described embodiments, oscillations in three axes directions are produced to detect angular velocity components about three axes, oscillations in three directions are not necessarily required. For example, when there is employed a method comprising the steps of:

(1) measuring Coriolis force Fy in the Y-axis direction in the state where oscillation Uz in the Z-axis direction produced to detect angular velocity ωx about the X-axis, (2) measuring Coriolis force Fx in the X-axis direction in the state where oscillation Uz in the Z-axis direction is produced to detect angular velocity ωy about the Y-axis, and (3) measuring Coriolis force Fx in the X-axis direction in the state where oscillation Uy in the Y-axis direction is produced to detect angular velocity ωz about the Z-axis, it is possible to detect all angular velocity components about three axes only by oscillations in two axes directions of the Z-axis direction and the Y-axis direction. In addition, various combinations are conceivable. If sensors according to this invention are used as stated above, it is possible to detect all angular velocity components about three axes by a single sensor.

As described above, since a sensor according to this invention can detect a force exerted in one axis direction by two detection elements, the entire structure becomes very simple. Further, since an inside annular region to surround the origin from the periphery and an outside annular region to surround the inside annular region further from the periphery thereof are defined on the XY-plane, and respective detection elements are disposed along these annular regions, efficient arrangement of detection elements can be made. Thus, compact and high sensitivity sensor can be realized. Further, by carrying out a particular polarization processing to respectively vary polarization characteristic every piezoelectric elements constituting respective detection elements, it becomes possible to conveniently set polarities of charges produced on respective electrodes. Thus, wiring structure for respective electrodes is simplified. Further, by using a single common piezoelectric element caused to be common to respective detection elements, or using a common electrode layer therefor, the structure is simplified. Furthermore, since if substrate of conductive material is used, this substrate itself can be utilized as a common electrode layer, the number of electrode layers can be reduced. In addition, when an expanding/contracting element having the same structure as that of the detection element is arranged, a predetermined voltage is applied to the expanding/contracting element, thus making it possible to make up, in pseudo manner, a state equivalent to the state where an external force is exerted. Thus, self-diagnosis of the sensor can be made.

What is claimed is:

1. A force sensor using piezoelectric elements comprising:
 a substrate having flexibility wherein an origin is defined at a point within said substrate and an X-axis and a Y-axis extending in a direction in parallel to a principle surface of said substrate are defined, said X-axis and said Y-axis crossing perpendicular to each other at the origin to form an XY coordinate system;
 four detection elements composed of a piezoelectric element in a plate form, an upper electrode formed on an upper surface of said piezoelectric element and a lower electrode formed on a lower surface of said piezoelectric element, respective one of said upper electrode and said lower electrode being fixed to said substrate;
 a working body having a function for transmitting, to the origin, a force produced on the basis of a physical action exerted from an external source; and a sensor casing to which an outside peripheral portion of the substrate is fixed;

wherein a first detection element, a second detection element, a third detection element and a fourth detection element are respectively arranged in a negative region on the X-axis, in a positive region on the X-axis, in a negative region on the Y-axis and in a positive region on the Y-axis, respectively;

wherein a force relating to the X-axis direction produced in the working body is detected on the basis of charges produced in the first detection element and the second detection element, and a force relating to the Y-axis direction produced in the working body is detected on the basis of charges produced in the third detection element and the fourth detection element; and wherein either a group of plural lower electrodes or a group of plural upper electrodes is constituted by a single electrode layer.

2. A force sensor using piezoelectric elements as set forth in claim 1:

wherein an inside annular region to surround the origin from a periphery and an outside annular region to surround said inside annular region further from a periphery thereof are defined;

wherein a first detection element is arranged in a region extending over the second and third quadrants of the XY coordinate system within said outside annular region;

wherein a second detection element is arranged in a region extending over the first and fourth quadrants of the XY coordinate system within said outside annular region;

wherein a third detection element is arranged in a region extending over the third and fourth quadrants of the XY coordinate system within said inside annular region; and wherein a fourth detection element is arranged in a region extending over the first and second quadrants of the XY coordinate system within said inside annular region.

3. A force sensor using piezoelectric elements comprising:

a substrate having flexibility wherein an origin is defined at a point within said substrate, an X-axis and a Y-axis extending in a direction in parallel to a principle surface of said substrate are defined, said X-axis and said Y-axis crossing perpendicular to each other at the origin to form an XY coordinate system, a Z-axis passing through the origin and perpendicular to an XY-plane passing through the origin is defined, and a fourth axis passing through the origin and extending along the XY-plane is defined;

six detection elements composed of a piezoelectric element in a plate form, an upper electrode formed on an upper surface of said piezoelectric element and a lower electrode formed on a lower surface of said piezoelectric element, respective one of said upper electrode and said lower electrode being fixed to said substrate;

a working body having a function for transmitting, to the origin, a force produced on the basis of a physical action exerted from an external source; and a sensor casing to which an outside peripheral portion of the substrate is fixed;

wherein a first detection element, a second detection element, a third detection element, a fourth detection element, a fifth detection element and a sixth detection element are respectively arranged in a negative region on the X-axis, in a positive region on the X-axis, in a negative region on the Y-axis, in a positive region on the Y-axis, in a negative region on the fourth axis and in a positive region on the fourth axis, respectively;

wherein a force relating to the X-axis direction produced in the working body is detected on the basis of charges produced in the first detection element and the second detection element, a force relating to the Y-axis direction produced in the working body is detected on the basis of charges produced in the third detection element and the fourth detection element and a force relating to the Z-axis direction produced in the working body is detected on the basis of charges produced in the fifth detection element and sixth detection element; and wherein either a group of plural lower electrodes or a group of plural upper electrodes is constituted by a single electrode layer.

4. A force sensor using piezoelectric elements as set forth in claim 3, wherein the X-axis is used as the fourth axis.

5. A force sensor using piezoelectric elements as set forth in claim 4:

wherein an inside annular region to surround the origin from a periphery and an outside annular region to surround said inside annular region further from a periphery thereof are defined on the XY-plane;

wherein the first detection element is arranged in a region extending over the second and third quadrants of the XY coordinate system within said outside annular region;

wherein the second detection element is arranged in the region extending over the first and fourth quadrants of the XY coordinate system within the outside annular region;

wherein the third detection element is arranged in a region extending over the third and fourth quadrants of the XY coordinate system within said inside annular region;

wherein the fourth detection element is arranged in a region extending over the first and second quadrants of the XY coordinate system within said inside annular region;

wherein the fifth detection element is arranged in a negative region on the X-axis within said inside annular region so that it is positioned between the third and the fourth detection elements; and wherein sixth detection element is arranged in a positive region on the X-axis within said inside annular region so that it is positioned between the third and the fourth detection elements.

6. A force sensor using piezoelectric element as set forth in claim 4:

wherein an inside annular region to surround the origin from a periphery and an outside annular region to surround said inside annular region further from a periphery thereof are defined on the XY-plane;

wherein a first detection element is arranged in a region extending over the first and second quadrants of the XY coordinate system within said outside annular region;

wherein a second detection element is arranged in a region extending over the third and fourth quadrants of the XY coordinate system within said outside annular region;

wherein a third detection element is arranged in a region extending over the second and third quadrants of the XY coordinate system within said inside annular region;

wherein a fourth detection element is arranged in a region extending over the first and fourth quadrants of the XY coordinate system within said inside annular region;

wherein a fifth detection element is arranged in a negative region on the X-axis within said outside annular region so that it is positioned between the first and the second detection elements; and wherein a sixth detection element is arranged in a positive region on the X-axis within said outside annular region so that it is positioned between the first and the second detection elements.

7. A force sensor using piezoelectric element as set forth in claim 5:

wherein a seventh detection element and an eighth detection element are further provided in addition;

wherein the seventh detection element is arranged in the negative region on the Y-axis within the outside annular region so that it is positioned between the first and the second detection elements;

wherein the eighth detection element is arranged in the positive region on the Y-axis within the outside annular region so that it is positioned between the first and the second detection elements; and wherein a force relating to the Z-axis direction produced in the working body is detected on the basis of charges produced in the fifth to the eighth detection elements.

8. A force sensor using piezoelectric elements comprising:

a substrate having flexibility wherein an origin is defined at a point within said substrate and an X-axis and a Y-axis extending in a direction in parallel to a principle surface of said substrate are defined, said X-axis and said Y-axis crossing perpendicular to each other at the origin to form an XY coordinate system;

four detection elements composed of a piezoelectric element in a plate form, an upper electrode formed on an upper surface of said piezoelectric element and a lower electrode formed on a lower surface of said piezoelectric element, respective one of said upper electrode and said lower electrode being fixed to said substrate;

a working body having a function for transmitting, to an outside peripheral portion of the substrate, a force produced on the basis of a physical action exerted from an external source; and a sensor casing to which said origin is fixed;

wherein a first detection element, a second detection element, a third detection element and a fourth detection element are respectively arranged in a negative region on the X-axis, in a positive region on the X-axis, in a negative region on the Y-axis and in a positive region on the Y-axis, respectively;

wherein a force relating to the X-axis direction produced in the working body is detected on the basis of charges produced in the first detection element and the second detection element, and a force relating to the Y-axis direction produced in the working body is detected on the basis of charges produced in the third detection element and the fourth detection element; and wherein either a group of plural lower electrodes or a group of plural upper electrodes is constituted by a single electrode layer.

9. A force sensor using piezoelectric elements as set forth in claim 8:

wherein an inside annular region to surround the origin from a periphery and an outside annular region to surround said inside annular region further from a periphery thereof are defined;

wherein a first detection element is arranged in a region extending over the second and third quadrants of the XY coordinate system within said outside annular region;

wherein a second detection element is arranged in a region extending over the first and fourth quadrants of the XY coordinate system within said outside annular region;

wherein a third detection element is arranged in a region extending over the third and fourth quadrants of the XY coordinate system within said inside annular region; and wherein a fourth detection element is arranged in a region extending over the first and second quadrants of the XY coordinate system within said inside annular region.

10. A force sensor using piezoelectric elements comprising:

a substrate having flexibility wherein an origin is defined at a point within said substrate, an X-axis and a Y-axis extending in a direction in parallel to a principle surface of said substrate are defined, said X-axis and said Y-axis crossing perpendicular to each other at the origin to form an XY coordinate system, a Z-axis passing through the origin and perpendicular to an XY-plane passing through the origin is defined, and a fourth axis passing through the origin and extending along the XY-plane is defined;

six detection elements composed of a piezoelectric element in a plate form, an upper electrode formed on an upper surface of said piezoelectric element and a lower electrode formed on a lower surface of said piezoelectric element, respective one of said upper electrode and said lower electrode being fixed to said substrate;

a working body having a function for transmitting, to an outside peripheral portion of the substrate, a force produced on the basis of a physical action exerted from an external source; and a sensor casing to which said origin is fixed;

wherein a first detection element, a second detection element, a third detection element, a fourth detection element, a fifth detection element and a sixth detection element are respectively arranged in a negative region on the X-axis, in a positive region on the X-axis, in a negative region on the Y-axis, in a positive region on the Y-axis, in a negative region on the fourth axis and in a positive region on the fourth axis, respectively;

wherein a force relating to the X-axis direction produced in the working body is detected on the basis of charges produced in the first detection element and the second detection element, a force relating to the Y-axis direction produced in the working body is detected on the basis of charges produced in the third detection element and the fourth detection element and a force relating to the Z-axis direction produced in the working body is detected on the basis of charges produced in the fifth detection element and sixth detection element; and wherein either a group of plural lower electrodes or a group of plural upper electrodes is constituted by a single electrode layer.

11. A force sensor using piezoelectric elements as set forth in claim 10, wherein the X-axis is used as the fourth axis.

12. A force sensor using piezoelectric elements as set forth in claim 11:

wherein an inside annular region to surround the origin from a periphery and an outside annular region to surround said inside annular region further from a periphery thereof are defined on the XY-plane;

wherein the first detection element is arranged in a region extending over the second and third quadrants of the XY coordinate system within said outside annular region;

wherein the second detection element is arranged in the region extending over the first and fourth quadrants of the XY coordinate system within the outside annular region;

wherein the third, detection element is arranged in a region extending over the third and fourth quadrants of the XY coordinate system within said inside annular region;

wherein the fourth detection element is arranged in a region extending over the first and second quadrants of the XY coordinate system within said inside annular region;

wherein the fifth detection element is arranged in a negative region on the X-axis within said inside annular region so that it is positioned between the third and the fourth detection elements; and wherein sixth detection element is arranged in a positive region on the X-axis within said inside annular region so that it is positioned between the third and the fourth detection elements.

13. A force sensor using piezoelectric element as set forth in claim 11:

wherein an inside annular region to surround the origin from a periphery and an outside annular region to surround said inside annular region further from a periphery thereof are defined on the XY-plane;

wherein a first detection element is arranged in a region extending over the first and second quadrants of the XY coordinate system within said outside annular region;

wherein a second detection element is arranged in a region extending over the third and fourth quadrants of the XY coordinate system within said outside annular region;

wherein a third detection element is arranged in a region extending over the second and third quadrants of the XY coordinate system within said inside annular region;

wherein a fourth detection element is arranged in a region extending over the first and fourth quadrants of the XY coordinate system within said inside annular region;

wherein a fifth detection element is arranged in a negative region on the X-axis within said outside annular region so that it is positioned between the first and the second detection elements; and wherein a sixth detection element is arranged in a positive region on the X-axis within said outside annular region so that it is positioned between the first and the second detection elements.

14. A force sensor using piezoelectric element as set forth in claim 12:

wherein a seventh detection element and an eighth detection element are further provided in addition;

wherein the seventh detection element is arranged in the negative region on the Y-axis within the outside annular region so that it is positioned between the first and the second detection elements;

wherein the eighth detection element is arranged in the positive region on the Y-axis within the outside annular region so that it is positioned between the first and the second detection elements; and wherein a force relating to the Z-axis direction produced in the working body is detected on the basis of charges produced in the fifth to the eighth detection elements.

15. A force sensor using piezoelectric elements as set forth in claim 1:

wherein predetermined polarization processing is implemented to piezoelectric elements of respective detection elements;

so that two detection elements for detecting a force relating to the X-axis direction, which are arranged on the opposite side each other with respect to the origin, have an opposite polarization characteristic each other; and so that two detection elements for detecting a force relating to the Y-axis direction, which are arranged on the opposite side each other with respect to the origin, have an opposite polarization characteristic each other.

16. A force sensor using piezoelectric elements as set forth in claim 8:

wherein predetermined polarization processing is implemented to piezoelectric elements of respective detection elements;

so that two detection elements for detecting a force relating to the X-axis direction, which are arranged on the opposite side each other with respect to the origin, have an opposite polarization characteristic each other; and so that two detection elements for detecting a force relating to the Y-axis direction, which are arranged on the opposite side each other with respect to the origin, have an opposite polarization characteristic each other.

17. A force sensor using piezoelectric elements as set forth in claim 1:

wherein the substrate having flexibility is constituted by a conductive material and said substrate itself is used as the single electrode layer.

18. A force sensor using piezoelectric elements as set forth in claim 8:

wherein the substrate having flexibility is constituted by a conductive material and said substrate itself is used as the single electrode layer.

19. A force sensor using piezoelectric elements as set forth in claim 1:

wherein there are further provided four expanding/contracting elements, each of which comprises a piezoelectric element in a plate form, an upper electrode formed on an upper surface of said piezoelectric element and a lower electrode formed on a lower surface of said piezoelectric element, and said expanding/contracting elements expand or contract in a layer direction of the electrodes when a predetermined voltage is applied between said upper electrode and said lower electrode, respective one of said upper electrode and said lower electrode of the respective expanding/contracting elements being fixed to the substrate; and, wherein the first expanding/contracting element, the second expanding/contracting element, the third expanding/contracting element and the fourth expanding/contracting element are respectively arranged in a negative region on the X-axis, in a positive region on the X-axis, in a negative region on the Y-axis, and in a positive region on the Y-axis;

so as to conduct test for the sensor by applying predetermined voltages across electrodes of the respective expanding/contracting elements to induce a displacement equivalent to the case where a force in a predetermined direction is applied to the working body.

20. A force sensor using piezoelectric elements as set forth in claim 8:

wherein there are further provided four expanding/contracting elements, each of which comprises a piezoelectric element in a plate form, an upper electrode formed on an upper surface of said piezoelectric element and a lower electrode formed on a lower surface of said piezoelectric element, and safe expanding/contracting elements expand or contract in a layer direction of the electrodes when a predetermined voltage is applied between said upper electrode and said lower electrode, respective one of said upper electrode and said lower electrode of the respective expanding/contracting elements being fixed to the substrate; and, wherein the first expanding/contracting element, the second expanding/contracting element, the third expanding/contracting element and the fourth expanding/contracting element are respectively arranged in a negative region on the X-axis, in a positive region on the X-axis, in a negative region on the Y-axis, and in a positive region on the Y-axis;

so as to conduct test for the sensor by applying predetermined voltages across electrodes of the respective expanding/contracting elements to induce a displacement equivalent to the case where a force in a predetermined direction is applied to the working body.

21. A force sensor using piezoelectric elements comprising:

a substrate constituted by a conductive material and having a thickness enough to have flexibility wherein an origin is defined at a point within said substrate and an X-axis and a Y-axis extending in a direction in parallel to a principle surface of said substrate are defined, said X-axis and said Y-axis crossing perpendicular to each other at the origin to form an XY coordinate system;

four detection elements composed of a piezoelectric element in a plate form and an upper electrode formed on an upper surface of said piezoelectric element, a lower surface of said piezoelectric element being fixed to said substrate;

a working body having a function for transmitting, to the origin, a force produced on the basis of a physical action exerted from an external source; and a sensor casing to which an outside peripheral portion of the substrate is fixed;

wherein a first detection element, a second detection element, a third detection element and a fourth detection element are respectively arranged in a negative region on the, X-axis, in a positive region on the X-axis, in a negative region on the Y-axis and in a positive region on the Y-axis, respectively; and wherein a force relating to the X-axis direction produced in the working body is detected on the basis of charges produced in the first detection element and the second detection element, and a force relating to the Y-axis direction produced in the working body is detected on the basis of charges produced in the third detection element and the fourth detection element.

22. A force sensor using, piezoelectric elements comprising:

a substrate constituted by a conductive material and having a thickness enough to have flexibility wherein an origin is defined at a point within said substrate and an X-axis and a Y-axis extending in a direction in parallel to a principle surface of said substrate are defined, said X-axis and said Y-axis crossing perpendicular to each other at the origin to form an XY coordinate system;

four detection elements composed of a piezoelectric element in a plate form and an upper electrode formed on an upper surface of said piezoelectric element, a lower surface of said piezoelectric element being fixed to said substrate;

a working body having a function for transmitting, to an outside peripheral portion of the substrate, a force produced on the basis of a physical action exerted from an external source; and a sensor casing to which said origin is fixed;

wherein a first detection element, a second detection element, a third detection element and a fourth detection element are respectively arranged in a negative region on the X-axis, in a positive region on the X-axis, in a negative region on the Y-axis and in a positive region on the Y-axis, respectively; and wherein a force relating to the X-axis direction produced in the working body is detected on the basis of charges produced in the first detection element and the second detection element, and a force relating to the Y-axis direction produced in the working body is detected on the basis of charges produced in the third detection element and the fourth detection element.

23. A force sensor using piezoelectric elements as set forth in claim 1:

wherein the working body has an enough weight to produce a force on the basis of an acceleration applied from an external source, thereby making it possible to detect acceleration.

24. A force sensor using piezoelectric elements as set forth in claim 8:

wherein the working body has an enough weight to produce a force on the basis of an acceleration applied from an external source, thereby making it possible to detect acceleration.

* * * * *